(12) United States Patent
Brooks et al.

(10) Patent No.: US 7,800,825 B2
(45) Date of Patent: Sep. 21, 2010

(54) USER INTERFACE INCLUDING COMPOSITE IMAGES THAT FLOAT

(75) Inventors: Brian E. Brooks, St. Paul, MN (US); Robert L. W. Smithson, Mahtomedi, MN (US); Glenn E. Casner, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 178 days.

(21) Appl. No.: 11/566,578

(22) Filed: Dec. 4, 2006

(65) Prior Publication Data

US 2008/0130126 A1    Jun. 5, 2008

(51) Int. Cl.
*G02B 27/10* (2006.01)
(52) U.S. Cl. .................................. 359/619; 359/620
(58) Field of Classification Search .................. 359/619
See application file for complete search history.

(56) References Cited

U.S. PATENT DOCUMENTS

| | | |
|---|---|---|
| 1,905,716 A | 4/1933 | Ives |
| 1,918,705 A | 7/1933 | Ives |
| 2,039,648 A | 5/1936 | Ives |
| 2,063,985 A | 12/1936 | Coffey |
| 2,279,825 A | 4/1942 | Kaszab |
| 2,326,634 A | 8/1943 | Gebhard et al. |
| 2,500,511 A | 3/1950 | Bonnet |
| 2,622,472 A | 12/1952 | Bonnet |
| 2,833,176 A | 5/1958 | Ossoniak |
| 3,154,872 A | 11/1964 | Nordgren |
| 3,161,509 A | 12/1964 | Howe et al. |
| 3,306,974 A | 2/1967 | Cunnally |
| 3,357,770 A | 12/1967 | Clay |
| 3,365,350 A | 1/1968 | Cahn |
| 3,442,569 A | 5/1969 | Bonnet |
| 3,459,111 A | 8/1969 | Cooper, Jr. |
| 3,503,315 A | 3/1970 | Montebello |
| 3,584,369 A | 6/1971 | Montebello |
| 3,607,273 A | 9/1971 | Kinney |
| 3,613,539 A | 10/1971 | Dudley |
| 3,671,122 A | 6/1972 | Dudley |
| 3,676,130 A | 7/1972 | Burckhardt et al. |
| 3,683,773 A | 8/1972 | Dudley |
| 3,706,486 A | 12/1972 | de Montebelo |
| 3,751,258 A | 8/1973 | Howe et al. |
| 3,801,183 A | 4/1974 | Sevelin et al. |
| 4,034,555 A | 7/1977 | Rosenthal |
| 4,082,426 A | 4/1978 | Brown |
| 4,099,838 A | 7/1978 | Cook et al. |

(Continued)

FOREIGN PATENT DOCUMENTS

CA    2326180    3/1999

(Continued)

OTHER PUBLICATIONS

3M Security Systems Division, 3M™ Authentication Reader Product Fact Sheet, 2004, 4 pages.

(Continued)

*Primary Examiner*—Jordan M. Schwartz
*Assistant Examiner*—James C Jones

(57) ABSTRACT

User interfaces that includes one or more composite images that are perceived by an observer to be suspended in space relative to the user interface.

46 Claims, 9 Drawing Sheets

U.S. PATENT DOCUMENTS

| | | |
|---|---|---|
| 4,121,011 A | 10/1978 | Glover et al. |
| 4,200,875 A | 4/1980 | Galanos |
| 4,315,665 A | 2/1982 | Haines |
| 4,420,527 A | 12/1983 | Conley |
| 4,424,990 A | 1/1984 | White et al. |
| 4,541,727 A | 9/1985 | Rosenthal |
| 4,541,830 A | 9/1985 | Hotta et al. |
| 4,552,442 A | 11/1985 | Street |
| 4,557,590 A | 12/1985 | Winnek |
| 4,618,552 A | 10/1986 | Tanaka et al. |
| 4,621,898 A | 11/1986 | Cohen |
| 4,629,667 A | 12/1986 | Kistner et al. |
| 4,632,895 A | 12/1986 | Patel et al. |
| 4,634,220 A | 1/1987 | Hockert et al. |
| 4,650,283 A | 3/1987 | Orensteen et al. |
| 4,668,063 A | 5/1987 | Street |
| 4,688,894 A | 8/1987 | Hockert |
| 4,691,993 A | 9/1987 | Porter et al. |
| 4,700,207 A | 10/1987 | Vanier et al. |
| 4,708,920 A | 11/1987 | Orensteen et al. |
| 4,714,656 A | 12/1987 | Bradshaw et al. |
| 4,732,453 A | 3/1988 | de Montebello et al. |
| 4,743,526 A | 5/1988 | Ando et al. |
| 4,757,350 A | 7/1988 | Street |
| 4,765,656 A | 8/1988 | Becker et al. |
| 4,772,582 A | 9/1988 | DeBoer |
| 4,775,219 A | 10/1988 | Appeldorn et al. |
| 4,783,124 A | 11/1988 | Baba et al. |
| 4,799,739 A | 1/1989 | Newswanger |
| 4,833,124 A | 5/1989 | Lum |
| 4,876,235 A | 10/1989 | DeBoer |
| 4,892,336 A | 1/1990 | Kaule et al. |
| 4,917,292 A | 4/1990 | Drexler |
| 4,927,238 A | 5/1990 | Green et al. |
| 4,935,335 A | 6/1990 | Fotland |
| 5,064,272 A | 11/1991 | Bailey et al. |
| 5,091,483 A | 2/1992 | Mazurek et al. |
| 5,105,206 A | 4/1992 | Sarraf et al. |
| 5,169,707 A | 12/1992 | Faykish et al. |
| 5,183,597 A | 2/1993 | Lu |
| 5,204,160 A | 4/1993 | Rouser |
| 5,244,288 A | 9/1993 | Nagaoka et al. |
| 5,254,390 A | 10/1993 | Lu |
| 5,264,278 A | 11/1993 | Mazurek et al. |
| 5,279,912 A | 1/1994 | Telfer et al. |
| 5,308,737 A | 5/1994 | Bills et al. |
| 5,326,619 A | 7/1994 | Dower et al. |
| 5,330,799 A | 7/1994 | Sandor et al. |
| 5,359,454 A | 10/1994 | Steenblik et al. |
| 5,360,694 A | 11/1994 | Thien et al. |
| 5,364,740 A | 11/1994 | Fohrenkamm et al. |
| 5,449,200 A | 9/1995 | Andric et al. |
| 5,449,597 A | 9/1995 | Sawyer |
| 5,455,689 A | 10/1995 | Taylor et al. |
| 5,459,016 A | 10/1995 | Debe et al. |
| 5,491,045 A | 2/1996 | DeBoer et al. |
| 5,506,300 A | 4/1996 | Ward et al. |
| 5,514,730 A | 5/1996 | Mazurek et al. |
| 5,521,035 A | 5/1996 | Wolk et al. |
| 5,554,432 A | 9/1996 | Sandor et al. |
| 5,589,246 A | 12/1996 | Calhoun et al. |
| 5,594,841 A | 1/1997 | Schultz |
| 5,639,580 A | 6/1997 | Morton |
| 5,642,226 A | 6/1997 | Rosenthal |
| 5,644,431 A | 7/1997 | Magee |
| 5,671,089 A | 9/1997 | Allio |
| 5,680,171 A | 10/1997 | Lo et al. |
| 5,681,676 A | 10/1997 | Telfer et al. |
| 5,685,939 A | 11/1997 | Wolk et al. |
| 5,689,372 A | 11/1997 | Morton |
| 5,691,846 A | 11/1997 | Benson, Jr. et al. |
| 5,706,133 A | 1/1998 | Orensteen et al. |
| 5,712,731 A | 1/1998 | Drinkwater et al. |
| 5,717,844 A | 2/1998 | Lo et al. |
| 5,744,291 A | 4/1998 | Ip |
| 5,757,550 A | 5/1998 | Gulick, Jr. |
| 5,828,488 A | 10/1998 | Ouderkirk et al. |
| 5,843,617 A | 12/1998 | Patel et al. |
| 5,850,278 A | 12/1998 | Lo et al. |
| 5,850,580 A | 12/1998 | Taguchi et al. |
| 5,856,061 A | 1/1999 | Patel et al. |
| 5,877,895 A | 3/1999 | Shaw et al. |
| 5,882,774 A | 3/1999 | Jonza et al. |
| 5,889,118 A | 3/1999 | Delgado et al. |
| 5,894,069 A | 4/1999 | Wen et al. |
| 5,896,230 A | 4/1999 | Goggins |
| 5,935,758 A | 8/1999 | Patel et al. |
| 5,945,249 A | 8/1999 | Patel et al. |
| 5,986,781 A | 11/1999 | Long |
| 5,994,026 A | 11/1999 | DeBoer et al. |
| 6,028,621 A | 2/2000 | Yakubovich |
| 6,057,067 A | 5/2000 | Isberg et al. |
| 6,084,713 A | 7/2000 | Rosenthal |
| 6,092,465 A | 7/2000 | Agronin |
| 6,095,566 A | 8/2000 | Yamamoto et al. |
| 6,110,645 A | 8/2000 | DeBoer et al. |
| 6,197,474 B1 | 3/2001 | Niemeyer et al. |
| 6,212,805 B1 | 4/2001 | Hill |
| 6,222,650 B1 | 4/2001 | Long |
| 6,228,555 B1 | 5/2001 | Hoffend, Jr. et al. |
| 6,242,152 B1 | 6/2001 | Staral et al. |
| 6,280,891 B2 | 8/2001 | Daniel et al. |
| 6,285,001 B1 | 9/2001 | Fleming et al. |
| 6,286,873 B1 | 9/2001 | Seder |
| 6,288,842 B1 | 9/2001 | Florczak et al. |
| 6,291,143 B1 | 9/2001 | Patel et al. |
| 6,300,502 B1 | 10/2001 | Kannan et al. |
| 6,351,537 B1 | 2/2002 | Dovogodko et al. |
| 6,369,844 B1 | 4/2002 | Neumann et al. |
| 6,388,043 B1 | 5/2002 | Langer et al. |
| 6,398,270 B1 | 6/2002 | Fukui et al. |
| 6,468,715 B2 | 10/2002 | Hoffend, Jr. et al. |
| 6,531,230 B1 | 3/2003 | Weber et al. |
| 6,552,830 B2 | 4/2003 | Long |
| 6,602,578 B1 | 8/2003 | Tompkin et al. |
| 6,729,655 B1 | 5/2004 | Dorricott et al. |
| 6,781,733 B1 | 8/2004 | Hira |
| 6,791,723 B1 | 9/2004 | Vallmajo et al. |
| 6,919,892 B1 | 7/2005 | Cheiky et al. |
| 7,054,042 B2 | 5/2006 | Holmes et al. |
| 7,068,434 B2 | 6/2006 | Florczak et al. |
| 7,196,822 B2 | 3/2007 | Hu |
| 7,246,824 B2 | 7/2007 | Hudson |
| 7,253,958 B2 | 8/2007 | Aizenberg et al. |
| 7,255,909 B2 | 8/2007 | Mann et al. |
| 7,265,904 B2 | 9/2007 | Schilling et al. |
| 7,333,268 B2 | 2/2008 | Steenblik et al. |
| 7,336,422 B2 | 2/2008 | Dunn et al. |
| 2002/0126396 A1 | 9/2002 | Dolgoff |
| 2002/0145807 A1 | 10/2002 | Nishikawa |
| 2003/0116630 A1 | 6/2003 | Carey et al. |
| 2005/0057812 A1 | 3/2005 | Raber |
| 2005/0142468 A1 | 6/2005 | Blood et al. |
| 2005/0142469 A1 | 6/2005 | Blood et al. |
| 2005/0161512 A1 | 7/2005 | Jones et al. |
| 2006/0029753 A1 | 2/2006 | Kuo et al. |
| 2006/0129489 A1 | 6/2006 | Hersch et al. |
| 2006/0209412 A1 | 9/2006 | Schilling et al. |
| 2006/0262411 A1 | 11/2006 | Dunn et al. |
| 2007/0081254 A1* | 4/2007 | Endle et al. .................. 359/626 |
| 2007/0132227 A1 | 6/2007 | Dean |
| 2007/0196616 A1 | 8/2007 | Stalder et al. |
| 2007/0284169 A1 | 12/2007 | Zabiega |
| 2008/0023890 A1 | 1/2008 | Sherman et al. |

| | | | |
|---|---|---|---|
| 2008/0024872 | A1 | 1/2008 | Dunn et al. |
| 2008/0027199 | A1 | 1/2008 | Mazurek et al. |
| 2008/0037131 | A1 | 2/2008 | Steenblik et al. |
| 2008/0118862 | A1 | 5/2008 | Dunn et al. |
| 2008/0130126 | A1 | 6/2008 | Brooks et al. |

FOREIGN PATENT DOCUMENTS

| | | |
|---|---|---|
| CA | 2326180 | 10/1999 |
| CA | 2 400 894 | 8/2001 |
| DE | 198 04 997 | 2/1999 |
| DE | 198 04 997 C1 | 2/1999 |
| EP | 0 175 504 | 3/1986 |
| EP | 0203752 B1 | 5/1986 |
| EP | 0 314 134 | 5/1989 |
| EP | 0 363 919 | 1/1990 |
| EP | 0 583 766 | 2/1994 |
| EP | 0 658 443 | 6/1995 |
| EP | 0 673 785 | 9/1995 |
| EP | 0 688 351 | 8/1997 |
| EP | 0 655 347 | 9/1997 |
| EP | 0 175 504 | 3/1998 |
| EP | 0 615 860 | 8/1998 |
| EP | 1 079 274 | 2/2001 |
| EP | 1 130 541 | 9/2001 |
| GB | 1 308 116 | 2/1973 |
| GB | 1 433 025 | 4/1976 |
| GB | 2 083 726 | 3/1982 |
| JP | 61-261701 | 11/1986 |
| JP | 01 065153 | 3/1989 |
| JP | 1-181083 | 12/1989 |
| JP | 03 068610 | 3/1991 |
| JP | 03 0686811 | 3/1991 |
| JP | 4309583 | 11/1992 |
| JP | 6-308895 | 11/1994 |
| JP | 7-140571 | 6/1995 |
| JP | 7-281327 | 10/1995 |
| JP | 10-186276 | 7/1998 |
| JP | 11-500236 | 1/1999 |
| JP | 2001116917 | 4/2001 |
| WO | WO 83/03019 | 9/1983 |
| WO | WO 95/26281 | 10/1995 |
| WO | 96/24867 | 8/1996 |
| WO | WO 96/24867 | 8/1996 |
| WO | WO 97/15173 | 4/1997 |
| WO | WO 97/46631 | 12/1997 |
| WO | WO 99/37949 | 7/1999 |
| WO | 99/42147 | 8/1999 |
| WO | WO 01/63341 | 8/2001 |
| WO | 00/222376 A1 | 3/2002 |
| WO | WO 02/22376 A1 | 3/2002 |
| WO | WO 03/005075 | 1/2003 |
| WO | 03/022598 A1 | 3/2003 |
| WO | WO 03/022598 A1 | 3/2003 |
| WO | WO 03/061983 | 7/2003 |
| WO | WO 2004/111706 | 12/2004 |
| WO | WO 2006/125224 A2 | 11/2006 |

OTHER PUBLICATIONS

3M Security Systems Division, 3M™ ePassport Reader Product Fact sheet, 2004, 6 pages.
3M Security Systems Division, 3M™ Full Page Reader Product Fact Sheet, 2004, 6 pages.
3M Security Systems Division, 3M™ Inspection Reader Product Fact Sheet, 2004, 2 pages.
Arnott, S.R., et al., "Attention switching in depth using random-dot autostereograms: Attention gradient asymmetries." Perception and Psychophysics, 62(7), pp. 1459-1473, 2000.
Backus, B., et al., "Human Cortical Activity Correlated With Stereoscopic Depth Perception", The American Physiological Society, J. Neurophysiol, Stereo Depth Perception and Cortical Activity, vol. 86, pp. 2054-2068, Oct. 2001.
Chau, A.W., et al., "Segregation by color and stereoscopic depth in three-dimensional visual space." Perception and Psychophsics, 57(7), pp. 1032-1044, 1995.
Gugerty, L.J., "Situation Awareness during Driving: Explicit and Implicit Knowledge in Dynamic Spatial Memory." Journal of Experimental Psychology: Applied, 3(1), pp. 42-66, 1997.
He, Z.J. et al., "Surfaces versus features in visual search." Nature, 359(6392), pp. 231-233, 1992.
Kasai, T. et al., "Attending to a location in three-dimensional space modulates early ERPs." Cognitive Brain Research, 17(2), pp. 273-285, 2003.
Mazza, V. et al., "Foreground-background segmentation and attention: A change blindness study." Psychological Research, 69(3), pp. 201-210, 2005.
Nakayama, K. et al., "Serial and parallel processing of visual feature conjunctions", Nature, 320(6059), pp. 264-265, 1986.
O'Toole, A.J. et al., "On the preattentive accessibility of stereoscopic disparity: Evidence from visual search." Perception and Psychophysics, 59(2), pp. 202-218, 1997.
Puhakka, M. et al., "Does preknowledge of target depth affect visual processing." Journal of Vision 3 (9), p. 599, 2003.
Rothrock, L. et al., "Applying the proximity compatibility and the control-display compatibility principles to engineering design interfaces." Human Factors and Ergonomics in Manufacturing, 16 (1), pp. 61-81, 1995.
Rumar, K., "The basic driver error: Late detection." Ergonomics, 33(10-11), pp. 1281-1290, 1990.
Strayer, D.L. et al., "Cell Phone-Induced Failures of Visual Attention During Simulated Driving." Journal of Experimental Psychology: Applied, 9 (1), 23-32, 2003.
Weekly Reports of the Meetings of the Academy of Science published, in accordance with an academy decision dated Jul. 13, 1835, vol. 146, Jan.-Jun. 1908, pp. 446-451.
Wickens, C. et al., "The proximity compatibility principle: its psychological foundation and relevance to display design." Human Factors, 37 (3), pp. 473-494, 1995.
Wolfe, J.M., et al., "What attributes guide the development of visual attention and how do they do it?" Nature Reviews Neuroscience, 5 (6), pp. 495-501, Jun. 2004.
Y.A. Dudnikov and B.K. Rozhkov, "Raster systems for producing of three-dimensional images", Leningrad, Maschinostroeniye, 1986, pp. 119-123.
U.S. Appl. No. 11/248,950, filed Oct. 11, 2005 entitled "Methods of Forming Sheeting with a Composite Image that Floats and Sheeting with a Composite Image that Floats."
DeMontebello, "Processing and Display of Three-Dimensional Data II", Proceedings of SPIE, vol. 507, San Diego, 1984.
Kim et al., "Polyurethanes having shape memory effects", *Polymer*, vol. 37 No. 26, pp. 5781-5793, 1996.
Pai, V.M., et al., "Microscopic flow visualization system for fluids in magnetic field", Journal of Magnetism and Magnetic Materials, vol. 194, No. 1-3, Apr. 1999, pp. 262-266.
Bollard, Dana et al., "Computer Vision", Prentice Hall, Inc., 1982, pp. 65-70.
Lendlein et al., "AB-polymer networks based on oligo(ε-caprolactone) segments showing shape-memory properties", *PNAS*, vol. 98, No. 3, pp. 842-847, 2001.
Lendlein and Kelch, "Shape-memory polymers", *Agnew. Chem. Int. Ed.* 2002, 41, 2034-2057.
Lendlein and Langer, "Biodegradable, elastic shape-memory polymers for potential biomedical applications", *Science*, vol. 296, pp. 1673-1676, 2002.
Mazurek et al., "Novel materials based on silicone-acrylate copolymer networks", *Journal of Applied Polymer Science*, vol. 80, pp. 159-180, 2001.
Factiva WireWatch Message, "Shape-memory polymers offer new twist on applications", *Modern Plastics International, Chemical Business NewsBase*, Apr. 24, 2003.
U.S. Appl. No. 11/960,837, filed Dec. 20, 2007 entitled "Sheeting with Composite Image that Floats."
U.S. Appl. No. 12/257,182, filed Oct. 23, 2008 entitled "Methods of Forming Sheeting with Composite Images that Float and Sheeting with Composite Image that Float."

U.S. Appl. No. 61/158,827, filed Mar. 10, 2009 entitled "User Interface with a Composite Image That Floats."

U.S. Appl. No. 12/257,223, filed Oct. 23, 2008 entitled "Methods of Forming Sheeting with Composite Images that Float and Sheeting with Composite Images that Float."

Yu. A. Dudknikov, B.K. Rozhkov, and E.N. Antipova, "Obtaining a Portrait of a Person by the Integral Photogrpahy Method," Dec. 20, 1979, pp. 562-563, Sov. J. Opt. Technol. 47(9), Sep. 1980, © 1981 The Optical Society of America.

Yu. A. Dudknikov and B.K. Rozhkov, "Selecting the Parameters of the Lens-Array Photographing System in Integral Photography," Feb. 24, 1977, pp. 349-351, Sov. J. Opt. Technol. 45(6), Jun. 1978, © 1979 The Optical Society of America.

International Search Report of International Patent Application No. PCT/US2007/084192.

* cited by examiner

```
OXOXOOOXXOOXXXOOXOX
OXXOXOXOXOXOXOXOOXO
XXOXOXOXOOXOOXOXOOX
OOXOOXOXOXOXOXOXOXO
XOOXOXXOOXXOXOXOXXX
OOXXOXOXOOXXOXXXOOX
XXOOXOOXOXOXOOXOXXO
OXOOXXOOXOXXOOXOXOX
XOXXOXOXOXOXOXOOXXO
```

USER INTERFACE INCLUDING COMPOSITE IMAGES THAT FLOAT

FIELD OF THE INVENTION

The present invention relates to a user interface that includes one or more images that are perceived by an observer to be suspended in space relative to the user interface.

BACKGROUND OF THE INVENTION

Various articles have been published about how the human visual system can only process a small number of visual elements simultaneously. The more elements that are added to a visual array, the longer and more resource intensive it is for the person, such as requiring more time to search for elements in the visual array and greater concentration to process such elements. This limitation of the human visual system poses a problem for human-interface designers because it is common that human interfaces typically have more elements in the interface than can be simultaneously processed by the user. As such, user interface designers are often forced to choose between overwhelming the user and severely limiting the number of elements that can be simultaneously displayed in the interface. Various methods have been developed to help decrease the amount of time a user needs to search for elements in a visual array, some of which are discussed in the following publications: Rothrock, L., Barron, K., Simpson, T. W., Frecker, M., Ligetti, C., & Barton, R. R. (2006), "Applying the proximity compatibility and the control-display compatibility principles to engineering design interfaces." *Human Factors and Ergonomics in Manufacturing,* 16 (1), 61-81; Wickens, C. D., & Carswell, C. M. (1995), "The proximity compatibility principle: its psychological foundation and relevance to display design." *Human Factors,* 37 (3), 473-494; and Mazza, V., Turatto, M. & Umilta, C. (2005), "Foreground-background segmentation and attention: A change blindness study." *Psychological Research* 69(3), 201-210.

SUMMARY OF THE INVENTION

One embodiment of the present invention provides a user interface. In this embodiment, the user interface comprises: a sheeting, comprising: at least one layer of microlenses, the layer having first and second sides; a layer of material disposed adjacent the first side of the layer of microlenses; and an at least partially complete image formed in the material associated with each of a plurality of the microlenses, wherein the image contrasts with the material; a first composite image, provided by the individual images, that appears to the unaided eye to float at a first distance above the sheeting; a second composite image, provided by the individual images, that appears to the unaided eye to float at a second distance above the sheeting, wherein the first and second distances are approximately the same distance, wherein the first and second composite images are related to the same task or mental operation.

Another embodiment of the present invention provides an alternative user interface. In this embodiment, the user interface comprises: a sheeting, comprising: at least one layer of microlenses, the layer having first and second sides; a layer of material disposed adjacent the first side of the layer of microlenses; and an at least partially complete image formed in the material associated with each of a plurality of the microlenses, wherein the image contrasts with the material; a first composite image, provided by the individual images, that appears to the unaided eye to float at a first distance below the sheeting; a second composite image, provided by the individual images, that appears to the unaided eye to float at a second distance below the sheeting, wherein the first and second distances are approximately the same distance, wherein the first and second composite images are related to the same task or mental operation.

Another embodiment of the present invention provides another alternative user interface. In this embodiment, the user interface comprises: a sheeting, comprising: an array of microlenses; a material layer adjacent the array of microlenses; and a first donor material in contact with the material layer, wherein the donor material forms individual, partially complete images on the material layer associated with each of a plurality of the microlenses; a first composite image, provided by the individual images, that appears to the unaided eye to float at a first distance above the sheeting; a second composite image, provided by the individual images, that appears to the unaided eye to float at a second distance above the sheeting, wherein the first and second distances are approximately the same distance, wherein the first and second composite images are related to the same task or mental operation.

Another embodiment of the present invention provides yet another alternative user interface. In this embodiment, the user interface, comprising: a sheeting, comprising: an array of microlenses; a material layer adjacent the array of microlenses; and a first donor material in contact with the material layer, wherein the donor material forms individual, partially complete images on the material layer associated with each of a plurality of the microlenses; a first composite image, provided by the individual images, that appears to the unaided eye to float at a first distance below the sheeting; a second composite image, provided by the individual images, that appears to the unaided eye to float at a second distance below the sheeting, wherein the first and second distances are approximately the same distance, wherein the first and second composite images are related to the same task or mental operation.

BRIEF DESCRIPTION OF THE DRAWINGS

The invention will be described herein with reference to the appended drawings, in which.

DETAILED DESCRIPTION OF THE INVENTION

Figure 1:
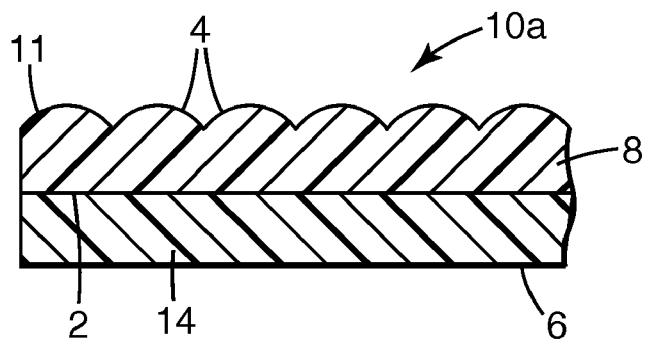
FIG. 1 is an enlarged cross sectional view of a microlens sheeting comprising a plano-convex base sheet.

As mentioned in the Background of the Invention, various articles have been published about how the human visual system can only process a relatively small number of visual elements simultaneously. As more elements are added to a visual array or user interface, it takes longer and requires a greater concentration by the person to search for particular elements in that visual array or user interface and to process such elements. As a result, user interface designers are often forced to choose between overwhelming the user and severely limiting the number of elements that can be simultaneously displayed in the interface. When using the term "user interface" herein, including the claims, this means any interface designed to allow a person to receive information from and/or to interact with. For example, a user interface could be included in automotive dashboards, aircraft cockpit surfaces, nuclear control rooms, control towers, informational kiosks for advertising, ordering, processing, etc., phones, personal/portable digital assistants (PDAs), global positioning systems (GPS) units, screens of computers, voice-activated screens, or any other type of interface where a person is receiving information or interacting with the interface. In the example of an automotive instrument panel having a user interface, some of the information displayed could include automotive speed, various warning lights affiliated with the engine, miles or kilometers affiliated with the travel distance of the automobile, a tachometer, turn signals, the temperature of the interior of the automobile or of the engine, fuel indicators, etc. As another example, a user may interact with the automobile instrument panel by observing that the temperature of the interior has dropped and as a result, increases the temperature gauge on the instrument panel. As yet another example, a user may interact with the automobile instrument panel by noticing that his speed is above the speed limit, and as a result, decreases his pressure on the accelerator until he observes that the speed of his automobile has decreased until it is within the speed limit. As yet another example, a user may interact with the automobile instrument panel by observing a warning signal in the form of a floating image indicating that another vehicle is in the driver's blind spot, so the driver may react by being more careful about a lane change maneuver. Such a floating image warning would be convenient when an audible warning might be bothersome to the driver.

One method to deploy the present invention is through the use of 3M Company's Floating Image technology. 3M Company's Floating Image technology provides a sheeting having a composite image, provided by individual partially complete images and/or individual complete images associated with a number of microlenses, that appears to be suspended, or to float above, in the plane of, and/or below the sheeting. These suspended images are referred to for convenience as floating images, and they can be located above or below the sheeting (either as two or three-dimensional images), or can be a three-dimensional image that appears above, in the plane of, and below the sheeting. The images can be in black and white or in color. The perspective of the composite image changes with the viewing angle. For example, the composite image can appear to move with the observer or can appear to disappear and then reappear, when the angle at which the sheeting is viewed changes. Unlike some holographic sheetings, imaged sheeting of the user interfaces of the present invention cannot be used to create a replica of itself. Additionally, the floating image(s) can be observed by a viewer with the unaided eye.

One embodiment of the present invention provides user interfaces including floating images. The use of floating images in user interfaces provides depth or height as a factor to certain images when viewing or receiving information from the user interface. Such user interfaces do not require thick user interfaces, expensive display technology, or invasive tools, such as goggles. Specifically, the use of this technology assists a user in searching in the user interface for certain information quicker and potentially processing information with less mistakes, thus improving the viewer's overall performance when interacting with the user interface of the present invention. The inventors have discovered that if certain information is displayed at certain depth ranges relative to the user, whether it appears to be floating above or floating below the user interface, the user is more easily able to find the information displayed and thus, able to process such information quicker. Specifically, the inventors have discovered that if floating images are related to the same task or method operation, then it is preferred that they appear to float approximately the same distances above or below the user interface and are preferably viewed stereoscopically. In addition, the floating images are created in a single plane sheeting (as discussed in more detail below), but appear to be floating either above, in, or below the sheeting, which allows the user interface to include several perceived depth levels, but in actuality, the user interface is generally along one plane and thin, compared to its perceived depth. This configuration is especially useful for user interfaces where space is generally limited for displaying information at various actual depth locations relative to the display, such as in the instrument panel of an automobile or airplane.

One embodiment of imaged sheeting having floating composite images useful for user interfaces of the present invention is disclosed in U.S. Pat. No. 6,288,842 (Florczak et al.), which is hereby incorporated by reference. Florczak et al. discloses microlens sheeting with composite images, in which the composite image floats above or below the sheeting, or both. The composite image may be two-dimensional or three-dimensional. Methods for providing such sheeting, including by the application of radiation to a material layer adjacent the microlenses are also disclosed. This patent discloses that composite images are created as a result of a compositional change, a removal or ablation of the material, a phase change, or a polymerization of the coating disposed adjacent to one side of the microlens layer or layers.

Another embodiment of imaged sheeting having floating composite images useful for user interfaces of the present invention is disclosed in U.S. patent application Ser. No. 11/248,950 (Endle et al.), which is hereby incorporated by reference. Endle et al. discloses microlens sheeting with composite images, in which the composite image floats above or below the sheeting, or both. The composite image may be two-dimensional or three-dimensional. Methods for providing such an imaged sheeting are also disclosed. This patent application discloses composite images that are created as a result of transferring a portion of a donor substrate to a microlens layer using a radiation source.

Yet another embodiment of imaged sheeting having microlenses and microimages useful for a user interface of the present invention is disclosed in U.S. Pat. No. 5,712,731, "Security Device for Security Documents Such as Bank Notes and Credit Cards," (Drinkwater et al.), which is hereby incorporated by reference. Drinkwater et al. discloses a security device that includes an array of microimages which, when viewed through a corresponding array of substantially spherical microlenses, generates a magnified image. In some cases, the array of microlenses is bonded to the array of microimages.

This patent application will first describe at least two embodiments for methods for creating composite floating images in sheeting that may be incorporated into user interfaces. Although two exemplary methods are described herein, other methods of creating composite images or similar images may be used. Next, the patent application describes use of composite images in user interfaces.

I. Methods for Creating Composite Floating Images

One example of a method for creating composite floating images useful in the user interfaces of the present invention includes using a radiation source to transfer a portion of radiation sensitive donor material that is placed adjacent a material layer of a microlens sheeting to form an image on the material layer. FIGS. 1-6A are related to this method.

Microlens sheeting in which the composite floating images can be formed comprise one or more discrete layers of microlenses with a layer of material adjacent to one side of the microlens layer or layers. For example, FIG. 1 illustrates one embodiment of a suitable type of microlens sheeting 10a. This sheeting comprises a transparent base sheet 8 having first and second broad faces, the second face 2 being substantially planer and the first face 11 having an array of substantially spherical or aspherical microlenses 4. A layer of material 14 is optionally provided on the second face 2 of the base sheet 8. The layer of material 14 includes a first side 6 for receiving donor material as described in more detail below.

Figure 2:
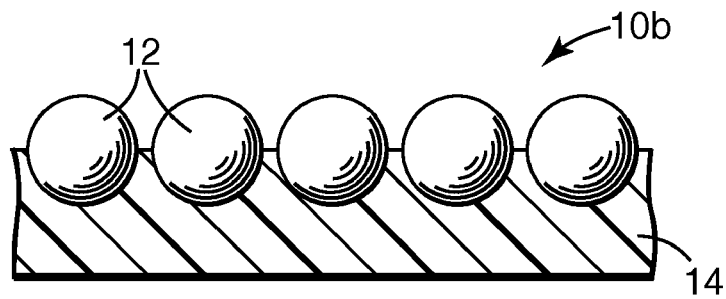
FIG. 2 is an enlarged cross sectional view of an "exposed lens" microlens sheeting.

As another example, FIG. 2 illustrates another embodiment of a suitable type of microlens sheeting 10b. The shape of the microlenses and thickness of the base sheet and their variability are selected such that light appropriate for viewing the sheeting is focused approximately at the first face 6. In this embodiment, the microlens sheeting is an "exposed lens" type of microlens sheeting 10b that includes a monolayer of transparent microspheres 12 that are partially embedded in a material layer 14, which is also typically a bead binder layer, such as a polymeric material. The layer of material 14 includes a first side 6 for receiving donor material as described in more detail below. The microspheres 12 are transparent both to the wavelengths of radiation that may be used to image the donor substrate material (explained in more detail below), as well as to the wavelengths of light in which the composite image will be viewed. This type of sheeting is described in greater detail in U.S. Pat. No. 3,801,183, except where the bead bond layer is very thin, for instance, to the extent where the bead bond layer is only between the beads, or occupying the interstitial spaces between the beads. Alternatively, this type of sheeting can be made by using microspheres of an appropriate optical index for focusing radiation approximately on the first side 6 of the layer of material 14 when the bead bond is of the thickness taught in U.S. Pat. No. 3,801,183. Such microspheres include polymethyl methylacrylate beads, which are commercially available from Esprix Technologies based in Sarasota, Fla.

Figure 3:
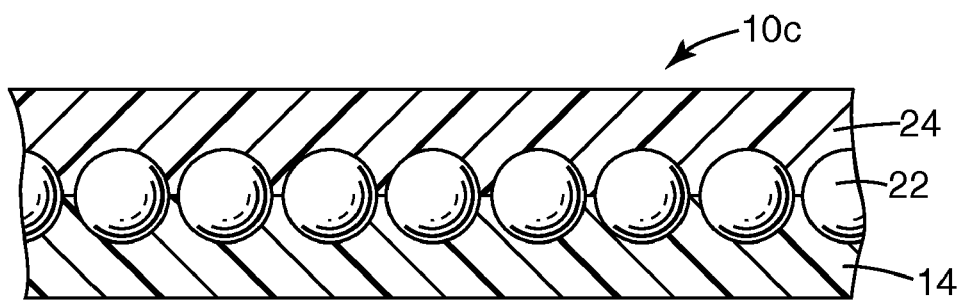
FIG. 3 is an enlarged cross sectional view of an "embedded lens" microlens sheeting.

As yet another example, FIG. 3 illustrates another embodiment of a suitable type of microlens sheeting 10c. In this embodiment, the microlens sheeting is an "embedded-lens" type of sheeting 10c in which the microsphere lenses 22 are embedded between a transparent protective overcoat 24, which is typically a polymeric material, and a material layer 14, which is also typically a bead binder layer, such as a polymeric material. The layer of material 14 includes a first side 6 for receiving donor material as described in more detail below. This type of sheeting is described in greater detail in U.S. Pat. No. 3,801,183, except that the reflective layer and adhesive would be removed, and the spacing layer 14 is reformulated so as to be less conformal to the curvature of the microspheres.

The microlenses of the sheeting 10 preferably have image forming refractive elements in order for image formation (described in more detail below) to occur; this is generally provided by forming spherically or aspherically shaped features. Other useful materials that provide a gradient refractive index (GRIN) will not necessarily need a curved surface to refract light. The microlenses may have any symmetry, such as cylindrical or spherical, provided real images are formed by the refraction surfaces. The microlenses themselves can be of discrete form, such as round plano-convex lenslets, round double convex lenslets, Fresnel lenslets, diffractive lenslets, rods, microspheres, beads, or cylindrical lenslets. Materials from which the microlenses can be formed include glass, polymers, minerals, crystals, semiconductors and combinations of these and other materials. Non-discrete microlens elements may also be used. Thus, microlenses formed from a replication or embossing process (where the surface of the sheeting is altered in shape to produce a repetitive profile with imaging characteristics) can also be used.

Microlenses with a uniform refractive index of between 1.4 and 3.0 over the visible and infrared wavelengths are preferred and more preferably, between 1.4 and 2.5, although not required. The refractive power of the microlenses, whether the individual microlenses are discrete or replicated, and regardless of the material from which the microlenses are made, is preferably such that the light incident upon the optical elements will focus on or near the first side 6 of the material layer 14. In certain embodiments, the microlenses preferably form a demagnified real image at the appropriate position on that layer. The construction of the microlens sheeting provides the necessary focusing conditions so that energy incident upon the front surface of the microlens sheeting is approximately focused upon a separate donor layer that is preferably radiation sensitive, which is described in more detail below.

Microlenses with diameters ranging from 15 micrometers to 275 micrometers are preferable, though other sized microlenses may be used. Good composite image resolution can be obtained by using microlenses having diameters in the smaller end of the aforementioned range for composite images that are to appear to be spaced apart from the microlens layer by a relatively short distance, and by using larger microlenses for composite images that are to appear to be spaced apart from the microlens layer by larger distances. Other microlenses, such as plano-convex, spherical or aspherical microlenses having lenslet dimensions comparable to those indicated for the microlenses, can be expected to produce similar optical results. Cylindrical lenses having lenslet dimensions comparable to those indicated for the microlenses can be expected to produce similar optical results, although different or alternative imaging optics train may be required.

As noted above, a layer of material 14 in FIGS. 1, 2 and 3 may be provided adjacent to the microlenses in the microlens sheeting 10. Suitable materials for the material layer 14 in the sheeting 10 include silicone, polyester, polyurethane, polycarbonate, polypropylene, or any other polymer capable of being made into sheeting or being supported by the base sheet 8. In one embodiment, the sheeting 10 may include a microlens layer and a material layer that are made from different materials. For example, the microlens layer may include acrylates, and the material layer may include polyester. In other embodiments, the sheeting 10 may include a microlens layer and a material layer that are made from the same materials. For example, the microlens and material layer of the sheeting 10 may be made of silicone, polyester, polyurethane, polycarbonate, polypropylene, or any other polymer capable of being made into sheeting, and may be formed by methods of mechanical embossing, replication or molding.

As described in more detail in reference to FIGS. 4a and 4b below, individual, partially complete images are formed on the material layer 14 associated with a plurality of microlenses using a donor substrate material, which, when viewed by an observer in front of said microlenses under reflected or transmitted light, provides a composite image that appears to be suspended, or float, above, in the plane of, and/or below the sheeting. Although other methods may be used, the preferred method for providing such images is to provide a radiation sensitive donor material, and to use radiation to transfer that donor material in a desired manner to provide the individual, partially complete images on the first side of the layer of material. This transfer process could include meltstick, sublimation, additive ablation (material transfer to a substrate by ablating a donor), diffusion and/or other physical material transfer processes.

Suitable radiation sensitive donor material substrates useful for this form of composite images include substrates coated with colorants in a binder, with or without additional radiation sensitive materials. The donor materials could be provided in bulk form or in roll form. As used herein, donor substrate material is "radiation sensitive" if, upon exposure to a given level of radiation, a portion of the donor material exposed transfers or preferentially adheres to a different location. The individual, partially complete images (illustrated in FIGS. 5 and 6A) are created as a result of an at least partial or complete removal of the radiation sensitive donor substrate material or colorant material from the donor substrate and the subsequent transfer of the donor substrate material or colorant material to the material layer of the microlens sheeting 10.

Figure 6:
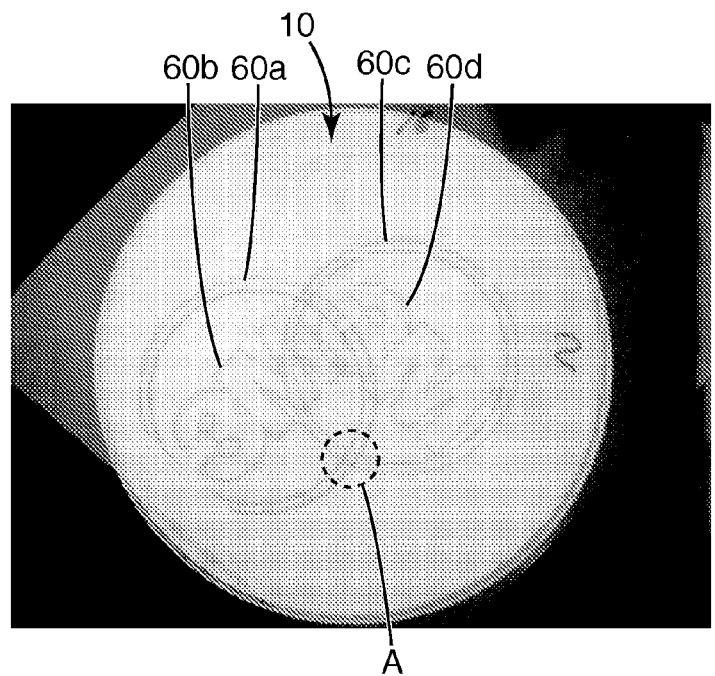
FIG. 6 is a photograph of a portion of microlens sheeting illustrating at least two composite images that appear to float above or below the sheeting in accordance with the method described in relationship to FIGS. 4a and 4b.

In one embodiment, the donor substrate includes colorants providing color within the visible spectrum, such as pigments, dyes, inks, or a combination of any or all of these to provide color composite floating images, such as those illustrated in FIG. 6. The pigments or dyes may be phosphorescent or fluorescent. Alternatively, the colorants in the donor materials may also appear metallic. The color of the resulting floating image is generally similar to the color of the colorant in the donor substrate, if the transferred donor substrate components are thermally stable and only small chemical or compositional changes occur upon transfer. In addition, the color of the resulting composite floating image may be the same as the color of the colorant in the donor substrate. In yet another embodiment, the donor substrates may include macroscopic patterns of different colorants, such as stripes or zones of different colors throughout the substrate or multicolored substrates. In alternative embodiments, the donor substrate is not required to include colorants providing color in the visible spectrum, and instead, the resulting composite floating images would appear colorless. Such donor substrates could contain colorless fluorescing dyes or phosphorescent materials, creating composite images visible only during or after exposure to specific wavelengths, or in the case of phosphorescent materials, during and for a duration after exposure to the wavelengths. Alternatively, such donor substrates may contain colorless materials that may or may not have a refractive index different than the material layer 14. A composite image formed from such donor materials may be only slightly visible when viewed in ambient lighting; however, it may appear to shine brighter than the reflections off of the nonimaged area of surface 6 when viewed with light substantially perpendicular to surface 6. All donor substrates may optionally include additives that increase the substrate sensitivity to imaging radiation and ultimately aid in the transfer of the material, or said substrates may include a reflective and/or absorbing layer underneath at least the colorant to increase absorption of the radiation. FIG. 4a schematically illustrates one embodiment of the method of forming a composite image on the microlens sheeting 10. The method includes using a radiation source 30. Any energy source providing radiation of the desired intensity and wavelength may be used as radiation source 30 with this method. In one embodiment, radiation devices capable of providing radiation having a wavelength of between 200 nanometers and 11 micrometers are preferred, and more preferably, between 270 nanometers and 1.5 micrometers. Examples of high peak power radiation sources useful for this method include passively Q-switched microchip lasers, and the family of Q-switched Neodymium doped lasers, and their frequency doubled, tripled, and quadrupled versions of any of these lasers, and Titanium doped-sapphire (abbreviated Ti:sapphire) lasers. Other examples of useful radiation sources include devices that give low peak power such as laser diodes, ion lasers, non Q-switched solid state lasers, metal vapor lasers, gas lasers, arc lamps and high power incandescent light sources.

For all useful radiation sources, the energy from the radiation source 30 is directed toward the microlens sheeting material 10 and controlled to give a highly divergent beam of energy. For energy sources in the ultraviolet, visible, and infrared portions of the electromagnetic spectrum, the light is controlled by appropriate optical elements, known to those skilled in the art. In one embodiment, a requirement of this arrangement of optical elements, commonly referred to as an optical train, is that the optical train direct light toward the sheeting material with appropriate divergence or spread so as to produce a "cone" of radiation irradiating the microlenses at the desired angles, thus irradiating the donor material aligned to said microlenses. The composite images created by this method are preferably obtained by using radiation spreading devices with numerical apertures (defined as the sine of the half angle of the maximum diverging rays) of greater than or equal to 0.3, although smaller numerical aperture illumination may be used. Radiation spreading devices with larger numerical apertures produce composite images having a greater viewing angle, and a greater range of apparent movement of the image. In alternative embodiments, the optical train may additionally contain elements to prevent radiation in an angular portion or portions of the cone of radiation. The resulting composite image(s) are only viewable over angles corresponding to the unblocked angular sections of the modified cone. Multiple composite images may be created at separate angular sections of the modified cone if desired. Using the modified cone and its inverse, one can produce a composite image that changes from one color to another as the sample is tilted. Alternatively, multiple composite images can be produced in the same area causing the individual images to appear and disappear as the sample is tilted.

Figure 4A:
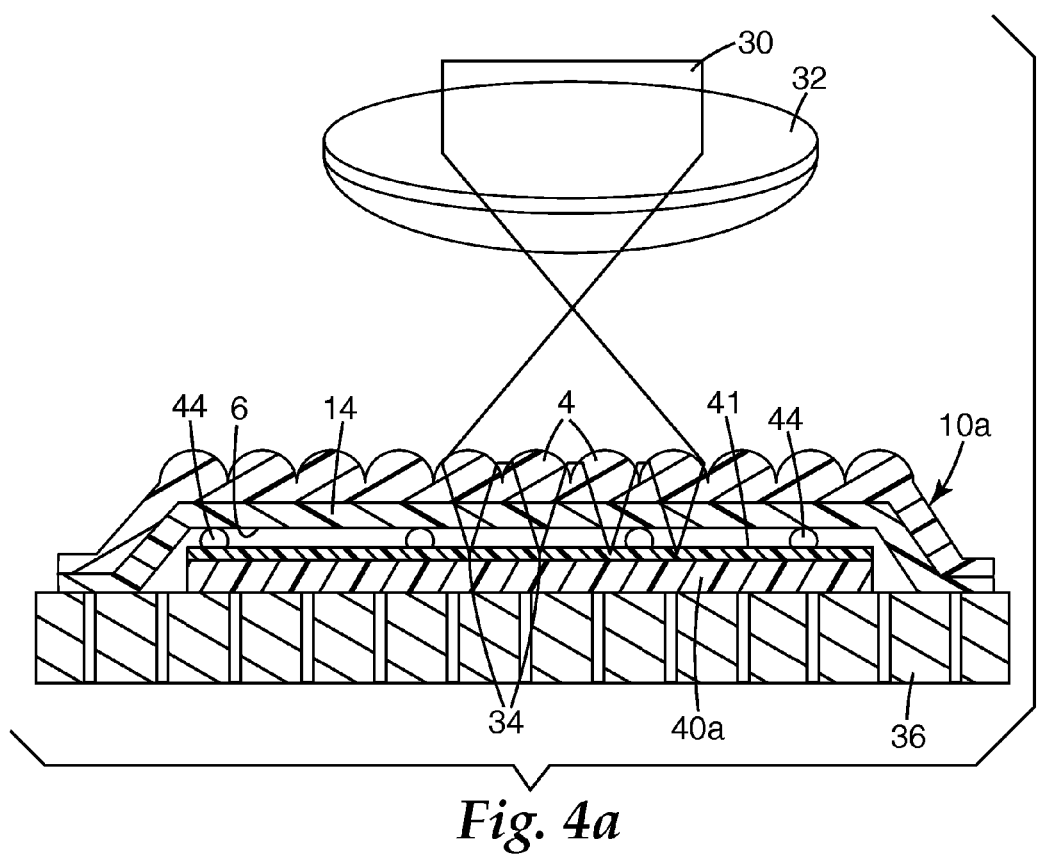
FIGS. 4a and 4b schematically illustrate one embodiment of a method of creating composite images using a donor sheet.
Figure 4B:
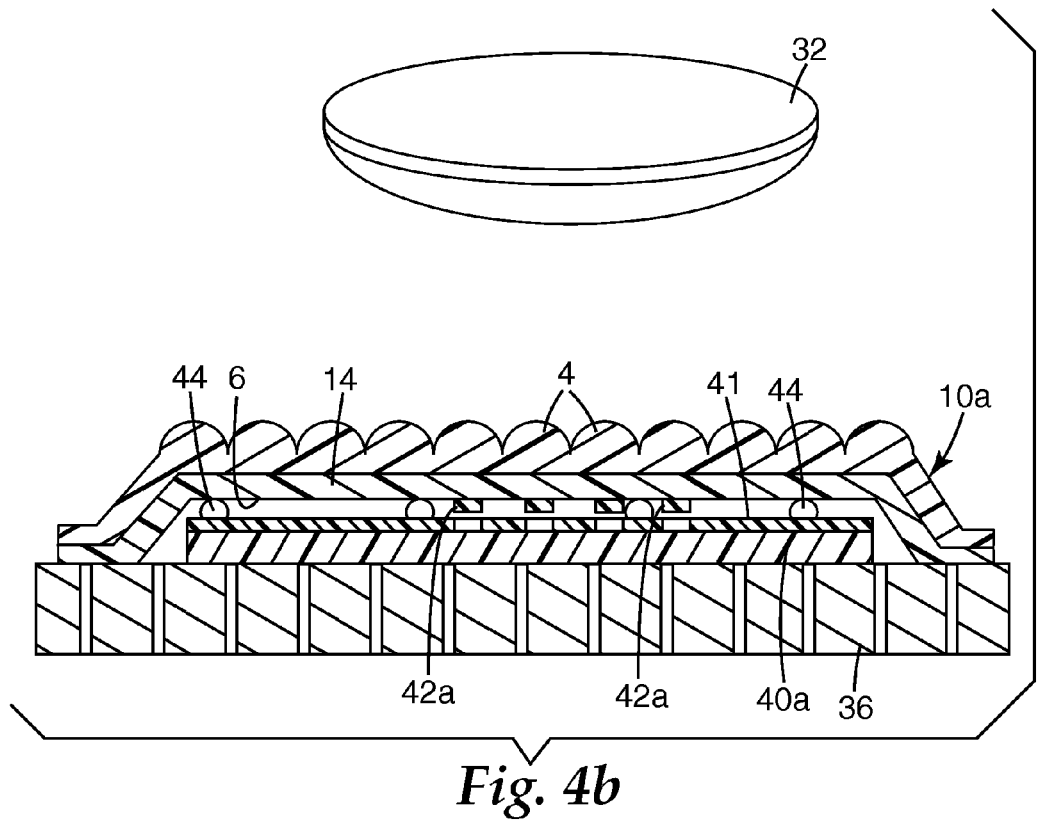

An exemplary imaging process for an embodiment of this method includes the following steps, as illustrated in FIGS. 4a and 4b. FIG. 4a illustrates the imaging process by the radiation source, and FIG. 4b illustrates the resulting sheeting 10 after the imaging process. First, a microlens sheeting 10 is provided, such as the microlens sheeting 10a, 10b, 10c illustrated in FIGS. 1-3. FIG. 4a illustrates the use of microlens sheeting 10a, however, microlens sheeting 10b or 10c may be used in the process. Next, a first donor substrate 40a is provided, such as the donor substrates described above. Next, the microlens sheeting 10 is positioned adjacent or orientated next to the donor substrate 40a, such that the microlens sheeting 10 is between the radiation source 30 and the donor substrate 40a. In one embodiment, the microlens sheeting 10 and donor substrate 40a are in close proximity to each other. In another embodiment, the microlens sheeting 10 and donor substrate 40a are in contact with one another or pressed against each other, for instance by gravity, mechanical means, or pressure gradients produced by a vacuum source 36, as illustrated in FIG. 4a. In yet another embodiment, microstructures 44 are between the microlens sheeting 10 and donor substrate 40a to provide a generally uniform gap or space between the microlens sheeting 10 and the donor substrate 40a. The microstructures 44 may be independent microstructures that are positioned between the microlens sheeting 10 and the donor substrate 40a. Examples of such independent microstructures 44 include polymethylmethacrylate spheres, polystyrene spheres, and silica spheres, all of which are commercially available from Esprix Technologies based in Sarasota, Fla. Alternatively, the microstructures 44 may extend from either the donor substrate 40a towards the microlens sheeting 10 or from the first side 6 of the layer of material 14 in the sheeting 10. Examples of suitable donor substrates 40 including such microstructures 44 include Kodak™ Approval media and Matchprint Digital Halftone media, commercially available from Kodak Polychrome Graphics located in Norwalk, Conn. Suitable microlens sheeting including such microstructures 44 are readily made, such as by replication, by those skilled in the art. Regardless, there is preferably a generally uniform spacing distance or gap between the microlens sheeting 10 and the donor substrate 40a which is determined and controlled by the size, spacing, arrangement and area coverage of microstructures 44. This generally uniform gap provides generally uniform registration between the top surface 41 of the donor substrate 40a and the focal points of the microlens optics 34.

Next, the method includes the step of transferring portions of donor material from the first donor material substrate 40a to the first side 6 of the layer of material 14 of the sheeting 10 to form individual, partially complete images on the first side 6 of material layer 14, as illustrated in FIG. 4b. In one embodiment of the inventive method illustrated in FIGS. 4a and 4b, this transfer is obtained by directing collimated light from a radiation source 30 through a lens 32 toward the microlens sheeting 10. The radiation source 30 is focused through the lens 32, through the microlens sheeting 10 and to the donor substrate 40a. The focal point 34 of the microlens 4 is approximately at the interface between the donor substrate 40a and the first side 6 of material layer 14 in the microlens sheeting 10 as illustrated in FIG. 4a. The donor material of substrate 40a absorbs incident radiation near the focal point 34 of the microlenses 4 on sheeting 10a. The absorption of the radiation induces the donor material of donor substrate 40a to transfer to the first side 6 of material layer 14 on sheeting 10a creating image pixels of donor material 42a that comprise the partially complete images corresponding to microlenses 4 of sheeting 10a as illustrated in FIG. 4b. In alternative embodiments of this process where the first side 6 of material layer 14 on sheeting 10a is in close proximity to the donor material 40a or adhered to the donor material 40a, transfer mechanisms such as radiation-induced diffusion and preferential adhesion (melt-stick process) producing image pixels of donor material 42a that comprise the partially complete images corresponding to microlenses 4 of sheeting 10a are also possible. The transferred donor material 42a may have experienced a change in its chemical or composition or component concentrations. These individual, partially complete images made from the donor material 42a together provide the composite floating image, which appears to the unaided eye to float above or below the sheeting 10 or both, as described further below.

Because each individual microlens 4 occupies a unique position relative to the optical axis, the radiation impinging on each microlens 4 will have a unique angle of incidence relative to the radiation incident on each other microlens. Thus, the light will be transmitted by each microlens 4 to a unique position relative to its specific microlens 4 on the donor substrate 40a close to focal point 34, and produces a unique image pixel of a partially complete image of donor materials 42a on the first side 6 of the layer of material 14 corresponding to each microlens 4. More precisely, a single light pulse produces only a single imaged dot of donor material 42a behind each properly exposed microlens 4, so to provide a partially complete image adjacent each microlens on the first side 6 of the material layer 14 of the sheeting 10. Multiple radiation pulses, or a quickly traversing, continuously illuminating, radiation beam may be used to create the image. For each pulse, the focal point of lens 32 is located at a new position relative to the position of the focal point 34 during the previous pulse relative to the microlensed sheeting. These successive changes in the position of the focal point 32 of the lens 32 relative to the microlenses 4 results in a corresponding change in the angle of incidence upon each microlens 4, and accordingly, in the position of the imaged pixel of the partially complete image of donor material 42a created on the material layer 14 of the sheeting 10 with the donor material 42 by that pulse. As a result, the radiation incident on the donor substrate 40a near focal point 34 causes transfer of a selected pattern of the radiation sensitive donor material 42a. Because the position of each microlens 4 is unique relative to every optical axis, the partially complete image formed by the transferred radiation sensitive donor material 42a for each microlens will be different from the image associated with every other microlens, because each microlens "sees" the incoming radiation from a different position. Thus, a unique image is formed associated with each microlens with the donor material 42a from the donor substrate on the material layer 14.

Another method for forming floating composite images uses a divergence creating target such as a lens array to produce the highly divergent light to image the microlensed material. For example, the lens array could consist of multiple small lenses all with high numerical apertures arranged in a planar geometry. When the array is illuminated by a light source, the array will produce multiple cones of highly divergent light, each individual cone being centered upon its corresponding lens in the array. The physical dimensions of the array are chosen to accommodate the largest lateral size of a composite image. By virtue of the size of the array, the individual cones of energy formed by the lenslets will expose the microlensed material as if an individual lens was positioned sequentially at all points of the array while receiving pulses of light. The selection of which lenses receive the incident light may occur by the use of a reflective mask, diffractive pattern generator, or by individually illuminating specific locations of the target with a low numerical aperture radiation beam. This mask will have transparent areas corresponding to sections of the composite image that are to be exposed and reflective areas where the image should not be exposed. Due to the lateral extent of the lens array, it may not be necessary to use multiple light pulses to trace out the image.

By having the mask fully illuminated by the incident energy, the portions of the mask that allow energy to pass through will form many individual cones of highly divergent light outlining the floating image as if the image was traced out by a single lens. As a result, only a single light pulse is needed to form the entire composite image in the microlens sheeting. Alternatively, in place of a reflective mask, a beam positioning system, such as a galvanometric xy scanner, can be used to locally illuminate the lens array and trace the composite image on the array. Since the energy is spatially localized with this technique, only a few lenslets in the array are illuminated at any given time. Those lenslets that are illuminated will provide the cones of highly diverging light needed to expose the microlensed material to form the composite image in the sheetings.

After imaging, depending upon the desirable viewable size of the composite image, a full or partially complete image will be present on the first side 6 of material layer 14 of the sheeting 10 behind each sufficiently exposed microlens formed from the donor material 42a. The extent to which an image is formed behind each microlens 4 on the material layer 14 depends on the energy incident upon that microlens. Portions of an intended image may be distant enough from a region of microlenses that the radiation incident upon those microlenses has an energy density lower than the level of radiation required to transfer corresponding donor material 42. Moreover, for a spatially extended image, when imaging with a fixed NA lens, not all portions of the sheeting will be exposed to the incident radiation for all parts of the intended image. As a result, portions of the intended image will not result in transferred radiation sensitive material, and only a partial image of the intended image will appear behind those microlenses on the material layer 14.

In FIG. 4b, a first donor substrate 40a is used to create individual partially complete images of donor material 42a on the sheeting 10. After the sheeting 10 has been imaged using the first donor substrate 40a, the first donor substrate 40a may be removed, and replaced with a second donor substrate. The method described above and illustrated in FIGS. 4a and 4b is then repeated with respect to the second donor sheet. The second donor substrate is used to create images of donor material 42b on the sheeting 10. In one embodiment, the second donor substrate includes a colorant that is different from the colorant in the first donor substrate 40a. This allows a user to form a composite image that consists of two different colors. That is, the composite image is multicolored, or has portions that are one color and portions that are a different color. Alternatively, the first and second donor substrates 40a, 40b, could be used to form two separate differently colored composite floating images, for example, as illustrated in FIG. 6. Alternatively, the colorants from the first and second donor substrates may result in a composite image formed from the mixture of the two colorants. In another embodiment, the colorants in the first and second donor substrates could include the same colorant. Any number of donor substrates 40 may be used to image the microlens sheeting 10 to form any number of floating composite images in a variety of different color combinations on a single sheeting 10.

Figure 5:
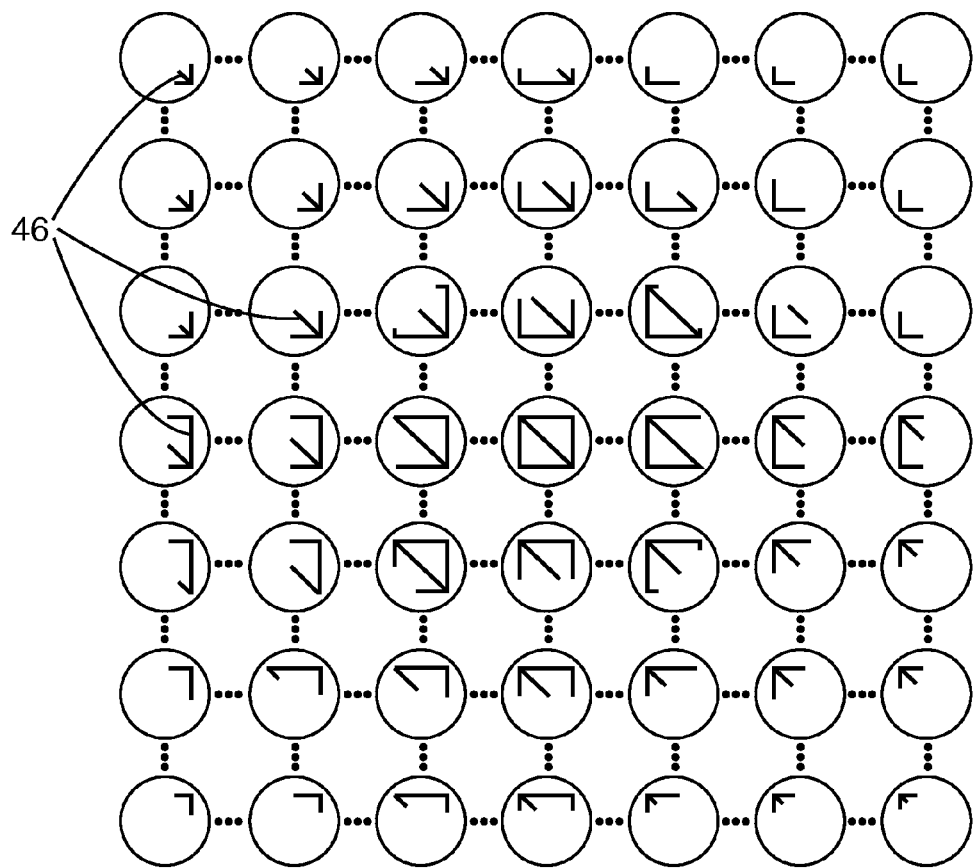
FIG. 5 is a plan view of a section of a microlens sheeting depicting sample images associated with individual microlenses, and further showing that the images range from complete replication to partial replication of the composite image.

FIG. 5 is a perspective view of a section of a microlens sheeting 10 depicting sample individual, partially complete images 46 formed by the radiation sensitive donor material 42 on the material layer 14 adjacent to individual microsphere 4 as viewed from the microlensed side of the microlensed sheeting, and further showing that the recorded images range from complete replication to partial replication.

Figure 6A:
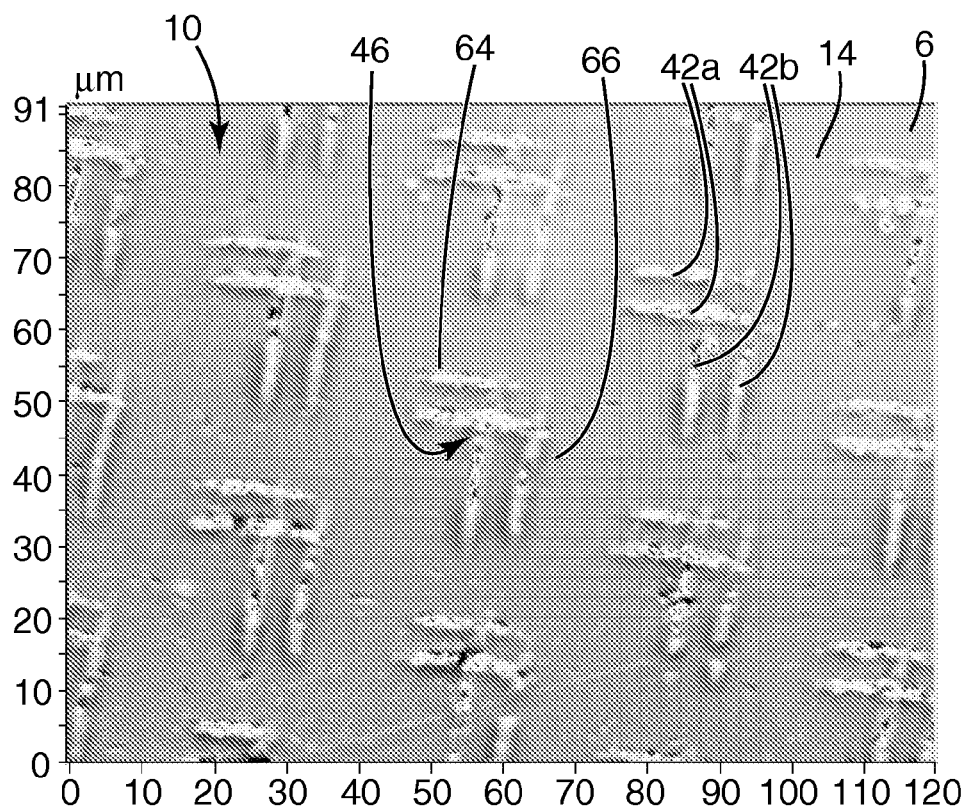
FIG. 6A is a photomicrograph of a portion of the backside of the microlens sheeting of FIG. 6.

FIGS. 6 and 6A shows a microlens sheeting 10 imaged according to one embodiment of the method, using two radiation sensitive donor substrates 40 to create multiple composite images of different colors. FIG. 6A is a magnified optical profile of the first side 6 of material layer 14 on sheeting 10 shown in FIG. 6. The sheeting 10 includes a first composite image 60a that floats below the sheeting that appears as a double circle in the color of black and a second composite image 60b of a "3M" outline, also in the same color of black located inside the double circle, that floats above the sheeting. The sheeting 10 also includes a third composite image 60c that floats below the sheeting that appears as a double circle in the color of purple and a fourth composite image 60d of a "3M" outline, also in the same color of purple located inside the double circle, that floats above the sheeting. The sheeting 10 was imaged with a first donor substrate having colorants of black. The sheeting 10 was then imaged with a second donor substrate having colorants of purple.

A portion of the section A that is indicated in FIG. 6 corresponds to the bottom view of sheeting 10 (i.e., first side 6 of material layer 14) in FIG. 6A. Specifically, FIG. 6A illustrates a magnified view of the individual, partially complete images 46 that together provide the intersection of the black and purple double circles of composite images 60a and 60c that appear to float below the sheeting (indicated in section A of FIG. 6).

The image 46 has two portions, a first portion 64 of black donor material 42a, and a second portion 66 of purple donor material 42b. Each image 46 corresponds generally to an individual microlens. The images 46 in FIG. 6A range in size from 24.5 to 27 um, however a range of other sizes are possible. FIG. 6A is convenient for illustrating the elevation of the donor materials above the surface of the material layer 14, as well as the impact upon the elevation level of the material layer 14 immediately adjacent the transferred donor material 42. The dark portions around the portions 64, 66 of the donor materials 42a, 42b indicate that the material layer 14 around those portions has been melted or its temperature was raised past it's glass transition temperature, and as a result, its associated elevation is 0.1-0.2 um below the plane of the first side 6 of material layer 14. These "divots" are created around the donor materials 42*a*, 42*b* as a result of the method of making, and possibly may serve to help enhance the image 60. The overall height of the donor material 42*a*, 42*b* ranges from approximately 0.1 to 0.75 um above the plane of the first side 6 of material 14 of the sheeting 10, however a range of other heights are possible.

These composite floating images 60 can also be thought of as the result of the summing together of many images 46, all with different perspectives of a real object. The many unique images are formed through an array of miniature lenses, all of which "see" the object or image from a different vantage point. Behind the individual miniature lenses, a perspective of the image is created by the donor material on the material layer that depends on the shape of the image and the direction from which the imaging energy source was received. In some embodiments of the method, only that portion of the image or object seen by the lens that has sufficient energy to result in the transfer of some of the radiation sensitive donor material will be recorded. Portions of the image or object that correlate to the lens being exposed to a correspondingly greater energy level may generally result in a greater amount of donor material being transferred, i.e. may result in images 46 that have a greater elevation above the first side 6 of the material layer 14 of the sheeting 10.

The "object" to be imaged is formed through the use of an intense light source by either tracing the outline of the "object" or by the use of a mask. For the image thus recorded to have a composite aspect, the light from the object must radiate over a broad range of angles. When the radiation from an object is coming from a single point of the object and is radiating over a broad range of angles, all the radiation rays are carrying information about the object, but only from that single point, though the information is from the perspective of the angle of the radiation ray. Now consider that in order to have relatively complete information about the object, as carried by the radiation rays, light must radiate over a broad range of angles from the collection of points that constitute the object. The range of angles of the radiation rays emanating from an object is controlled by optical elements interposed between the radiation source and the microlens sheeting. These optical elements are chosen to give the optimum range of angles necessary to produce a composite image. The best selection of optical elements results in a cone of radiation whereby the vertex of the cone terminates at the position of the object.

Various geometric optics used to describe the formation of various composite images are disclosed in the U.S. patent application Ser. No. 11/248,950 (Endle et al.), which is hereby incorporated by reference, for example the disclosure related to FIGS. 10-16. As noted previously, the imaging processes for creating floating composite images described herein are preferred, but not exclusive, embodiments.

Another example of a method for creating composite floating images useful in the user interfaces of the present invention includes an application of radiation to a material layer adjacent microlenses in a sheeting. The composite images are created as a result of a compositional change, a removal or ablation of the material, a phase change, or a polymerization of the coating disposed adjacent to one side of the microlens layer or layers. FIGS. 5 and 7-10 are related to the discussion of this method.

Figure 7:
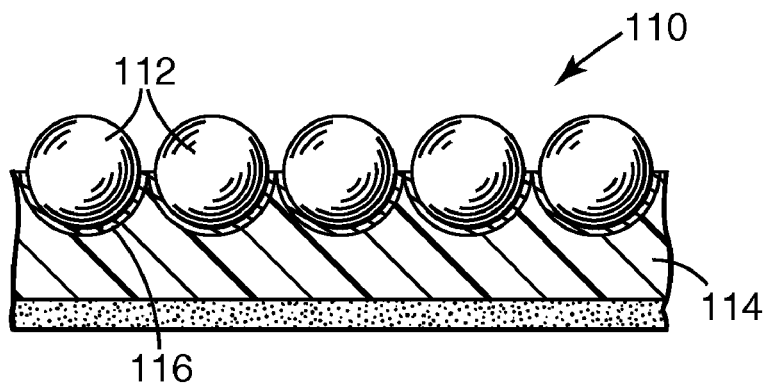
FIG. 7 is an enlarged cross sectional view of an alternative "exposed lens" microlens sheeting.

Microlens sheeting in which the composite images formed by this method comprise one or more discrete layers of microlenses with a layer of material (preferably a radiation-sensitive material or coating, as described below) disposed adjacent to one side of the microlens layer or layers. For example, FIG. 7 shows an "exposed lens" type of microlens sheeting 110 that includes a monolayer of transparent microspheres 112 that are partially embedded in a binder layer 114, which is typically a polymeric material. The microspheres are transparent both to the wavelengths of radiation that may be used to image the layer of material, as well as to the wavelengths of light in which the composite image will be viewed. The layer of material 116 is disposed at the rear surface of each microsphere, and in the illustrated embodiment typically contacts only a portion of the surface of each of the microspheres 112. This type of sheeting is described in greater detail in U.S. Pat. No. 2,326,634 and is presently available from 3M under the designation Scotchlite 8910 series reflective fabric.

Figure 8:
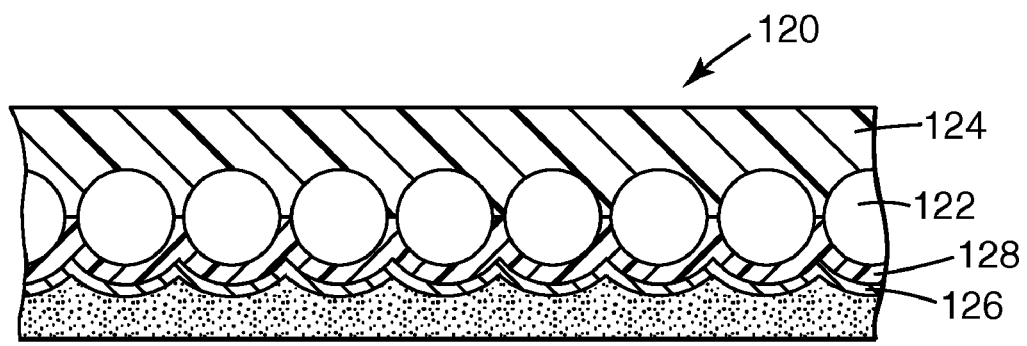
FIG. 8 is an enlarged cross sectional view of an alternative "embedded lens" microlens sheeting.

FIG. 8 shows another suitable type of microlens sheeting. This microlens sheeting 120 is an "embedded-lens" type of sheeting in which the microsphere lenses 122 are embedded in a transparent protective overcoat 124, which is typically a polymeric material. The layer of material 126 is disposed behind the microspheres at the back of a transparent spacer layer 128, which is also typically a polymeric material. This type of sheeting is described in greater detail in U.S. Pat. No. 3,801,183, and is presently available from 3M under the designation Scotchlite 3290 series Engineer grade retroreflective sheeting. Another suitable type of microlens sheeting is referred to as encapsulated lens sheeting, an example of which is described in U.S. Pat. No. 5,064,272, and presently is available from 3M under the designation Scotchlite 3870 series High Intensity grade retroreflective sheeting.

Figure 9:
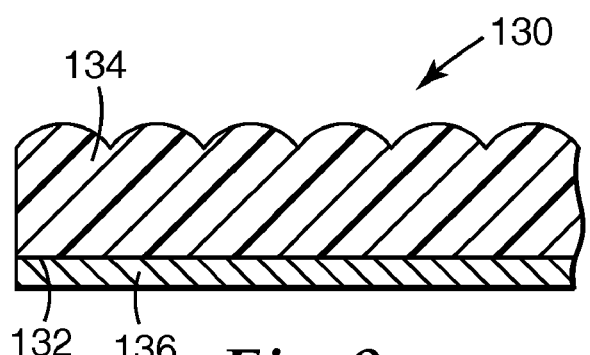
FIG. 9 is an enlarged cross sectional view of an alternative microlens sheeting comprising a plano-convex base sheet.

FIG. 9 shows yet another suitable type of microlens sheeting. This sheeting comprises a transparent plano-convex or aspheric base sheet 130 having first and second broad faces, the second face 132 being substantially planer and the first face having an array of substantially hemi-spheroidal or hemi-aspheroidal microlenses 134. The shape of the microlenses and thickness of the base sheet are selected such that collimated light incident to the array is focused approximately at the second face. The layer of material 136 is provided on the second face. Sheeting of this kind is described in, for example, U.S. Pat. No. 5,254,390, and is presently available from 3M under the designation 2600 series 3M Secure Card receptor.

The microlenses of the sheeting described in reference to FIGS. 7-9 preferably have an image forming refractive surface in order for image formation to occur; generally this is provided by a curved microlens surface. For curved surfaces, the microlens will preferably have a uniform index of refraction. Other useful materials that provide a gradient refractive index (GRIN) will not necessarily need a curved surface to refract light. The microlens surfaces are preferably spherical in nature, but aspherical surfaces are also acceptable. The microlenses may have any symmetry, such as cylindrical or spherical, provided real images are formed by the refraction surfaces. The microlenses themselves can be of discrete form, such as round plano-convex lenslets, round double convex lenslets, rods, microspheres, beads, or cylindrical lenslets. Materials from which the microlenses can be formed include glass, polymers, minerals, crystals, semiconductors and combinations of these and other materials. Non-discrete microlens elements may also be used. Thus, microlenses formed from a replication or embossing process (where the surface of the sheeting is altered in shape to produce a repetitive profile with imaging characteristics) can also be used.

Microlenses of the sheeting described in reference to FIGS. 7-9 preferably have a uniform refractive index of between 1.5 and 3.0 over the visible and infrared wavelengths. Suitable microlens materials will have minimal absorption of visible light, and in embodiments in which an energy source is used to image a radiation-sensitive layer the materials should exhibit minimal absorption of the energy source as well. The refractive power of the microlens, whether the microlens is discrete or replicated, and regardless of the material from which the microlenses are made, is preferably such that the light incident upon the refracting surface will refract and focus on the opposite side of the microlens. More specifically, the light will be focused either on the back surface of the microlens or on the material adjacent to the microlens. In embodiments in which the material layer is radiation sensitive, the microlenses preferably form a demagnified real image at the appropriate position on that layer. Demagnification of the image by approximately 100 to 800 times is particularly useful for forming images that have good resolution. The construction of the microlens sheeting to provide the necessary focusing conditions so that energy incident upon the front surface of the microlens sheeting is focused upon a material layer that is preferably radiation sensitive.

Microspheres of the sheeting described in reference to FIGS. 7-9 have diameters ranging from 15 micrometers to 275 micrometers are preferable, though other sized microspheres may be used. Good composite image resolution can be obtained by using microspheres having diameters in the smaller end of the aforementioned range for composite images that are to appear to be spaced apart from the microsphere layer by a relatively short distance, and by using larger microspheres for composite images that are to appear to be spaced apart from the microsphere layer by larger distances. Other microlens, such as plano-convex, cylindrical, spherical or aspherical microlenses having lenslet dimensions comparable to those indicated for the microspheres, can be expected to produce similar optical results.

As noted above, for this particular method of forming composite images, a layer of material is provided adjacent to the microlenses. Individual images formed in the material associated with a plurality of microlenses, when viewed by an observer under reflected or transmitted light, provide a composite image that appears to be suspended, or float, above, in the plane of, and/or below the sheeting. Although other methods may be used, the preferred method for providing such images is to provide a radiation sensitive material as the material layer, and to use radiation to alter that material in a desired manner to provide the image. Thus, although not limited thereby, the remaining discussion of the layer of material adjacent the microlenses will be provided largely in the context of a radiation sensitive material layer.

Radiation sensitive materials useful for this method include coatings and films of metallic, polymeric and semiconducting materials as well as mixtures of these. As used herein, a material is "radiation sensitive" if upon exposure to a given level of visible or other radiation the appearance of the material exposed changes to provide a contrast with material that was not exposed to that radiation. The image created thereby could thus be the result of a compositional change, a removal or ablation of the material, a phase change, or a polymerization of the radiation sensitive coating. Examples of some radiation sensitive metallic film materials include aluminum, silver, copper, gold, titanium, zinc, tin, chromium, vanadium, tantalum, and alloys of these metals. These metals typically provide a contrast due to the difference between the native color of the metal and a modified color of the metal after exposure to the radiation. The image, as noted above, may also be provided by ablation, or by the radiation heating the material until an image is provided by optical modification of the material. U.S. Pat. No. 4,743,526, for example, describes heating a metal alloy to provide a color change.

In addition to metallic alloys, metallic oxides and metallic suboxides can be used as a radiation sensitive medium. Materials in this class include oxide compounds formed from aluminum, iron, copper, tin and chromium. Non-metallic materials such as zinc sulfide, zinc selenide, silicon dioxide, indium tin oxide, zinc oxide, magnesium fluoride and silicon can also provide a color or contrast that is useful.

Multiple layers of thin film materials can also be used to provide unique radiation sensitive materials. These multilayer materials can be configured to provide a contrast change by the appearance or removal of a color or contrast agent. Exemplary constructions include optical stacks or tuned cavities that are designed to be imaged (by a change in color, for example) by specific wavelengths of radiation. One specific example is described in U.S. Pat. No. 3,801,183, which discloses the use of cryolite/zinc sulphide ($Na_3AlF_6$/ZnS) as a dielectric mirror. Another example is an optical stack composed of chromium/polymer (such as plasma polymerized butadiene)/silicon dioxide/aluminum where the thickness of the layers are in the ranges of 4 nm for chromium, between 20 nm and 60 nm for the polymer, between 20 nm and 60 nm for the silicon dioxide, and between 80 nm and 100 nm for the aluminum, and where the individual layer thicknesses are selected to provide specific color reflectivity in the visible spectrum. Thin film tuned cavities could be used with any of the single layer thin films previously discussed. For example, a tuned cavity with an approximately 4 nm thick layer of chromium and the silicon dioxide layer of between about 100 nm and 300 nm, with the thickness of the silicon dioxide layer being adjusted to provide an colored imaged in response to specific wavelengths of radiation.

Radiation sensitive materials useful for this method also include thermochromic materials. "Thermochromic" describes a material that changes color when exposed to a change in temperature. Examples of thermochromic materials useful in this method are described in U.S. Pat. No. 4,424,990, and include copper carbonate, copper nitrate with thiourea, and copper carbonate with sulfur containing compounds such as thiols, thioethers, sulfoxides, and sulfones. Examples of other suitable thermochromic compounds are described in U.S. Pat. No. 4,121,011, including hydrated sulfates and nitrides of boron, aluminum, and bismuth, and the oxides and hydrated oxides of boron, iron, and phosphorus.

Naturally, if the material layer is not going to be imaged using a source of radiation, then the material layer can, but is not required to, be radiation sensitive. Radiation sensitive materials are preferred for ease of manufacturing, however, and thus a suitable radiation source is preferably also used.

As noted above, a preferred manner of providing the image patterns on the layer of material adjacent the microlenses is to use a radiation source to image a radiation sensitive material. Any energy source providing radiation of the desired intensity and wavelength can be used with this method. Devices capable of providing radiation having a wavelength of between 200 nm and 11 micrometers are believed to be particularly preferred. Examples of high peak power radiation sources useful for this method include excimer flashlamps, passively Q-switched microchip lasers, and Q-switched Neodymium doped-yttrium aluminum garnet (abbreviated Nd:YAG), Neodymium doped-yttrium lithium fluoride (abbreviated Nd:YLF) and Titanium doped-sapphire (abbreviated Ti:sapphire) lasers. These high peak power sources are most useful with radiation sensitive materials that form images through ablation—the removal of material or in multiphoton absorption processes. Other examples of useful radiation sources include devices that give low peak power such as laser diodes, ion lasers, non Q-switched solid state lasers, metal vapor lasers, gas lasers, arc lamps and high power incandescent light sources. These sources are particularly useful when the radiation sensitive medium is imaged by a non-ablative method.

For all useful radiation sources, the energy from the radiation source is directed toward the microlens sheeting material and controlled to give a highly divergent beam of energy. For energy sources in the ultraviolet, visible, and infrared portions of the electromagnetic spectrum, the light is controlled by appropriate optical elements. In one embodiment, a requirement of this arrangement of optical elements, commonly referred to as an optical train, is that the optical train direct light toward the sheeting material with appropriate divergence or spread so as to irradiate the microlens and thus the material layer at the desired angles. The composite images are preferably obtained by using light spreading devices with numerical apertures (defined as the sine of the half angle of the maximum diverging rays) of greater than or equal to 0.3. Light spreading devices with larger numerical apertures produce composite images having a greater viewing angle, and a greater range of apparent movement of the image.

An examplary imaging process according to this method of creating composite images consists of directing collimated light from a laser through a lens toward the microlens sheeting illustrated in FIGS. 7-9. To create a sheeting having a floating image, as described further below, the light is transmitted through a diverging lens with a high numerical aperture (NA) to produce a cone of highly divergent light. A high NA lens is a lens with a NA equal to or greater than 0.3. The radiation sensitive coating side of the microspheres is positioned away from the lens, so that the axis of the cone of light (the optical axis) is perpendicular to the plane of the microlens sheeting.

Because each individual microlens occupies a unique position relative to the optical axis, the light impinging on each microlens will have a unique angle of incidence relative to the light incident on each other microlens. Thus, the light will be transmitted by each microlens to a unique position on the material layer, and produce a unique image. More precisely, a single light pulse produces only a single imaged dot on the material layer, so to provide an image adjacent each microlens, multiple pulses of light are used to create that image out of multiple imaged dots. For each pulse, the optical axis is located at a new position relative to the position of the optical axis during the previous pulse. These successive changes in the position of the optical axis relative to the microlenses results in a corresponding change in the angle of incidence upon each microlens, and accordingly in the position of the imaged dot created in the material layer by that pulse. As a result, the incident light focusing on the backside of the microsphere images a selected pattern in the radiation sensitive layer. Because the position of each microsphere is unique relative to every optical axis, the image formed in the radiation sensitive material for each microsphere will be different from the image associated with every other microsphere.

Another method for forming floating composite images uses a lens array to produce the highly divergent light to image the microlensed material. The lens array consists of multiple small lenses all with high numerical apertures arranged in a planar geometry. When the array is illuminated by a light source, the array will produce multiple cones of highly divergent light, each individual cone being centered upon its corresponding lens in the array. The physical dimensions of the array are chosen to accommodate the largest lateral size of a composite image. By virtue of the size of the array, the individual cones of energy formed by the lenslets will expose the microlensed material as if an individual lens was positioned sequentially at all points of the array while receiving pulses of light. The selection of which lenses receive the incident light occurs by the use of a reflective mask. This mask will have transparent areas corresponding to sections of the composite image that are to be exposed and reflective areas where the image should not be exposed. Due to the lateral extent of the lens array, it is not necessary to use multiple light pulses to trace out the image.

By having the mask fully illuminated by the incident energy, the portions of the mask that allow energy to pass through will form many individual cones of highly divergent light outlining the floating image as if the image was traced out by a single lens. As a result, only a single light pulse is needed to form the entire composite image in the microlens sheeting. Alternatively, in place of a reflective mask, a beam positioning system, such as a galvometric xy scanner, can be used to locally illuminate the lens array and trace the composite image on the array. Since the energy is spatially localized with this technique, only a few lenslets in the array are illuminated at any given time. Those lenslets that are illuminated will provide the cones of highly diverging light needed to expose the microlensed material to form the composite image in the sheetings.

The lens array itself can be fabricated from discrete lenslets or by an etching process to produce a monolithic array of lenses. Materials suitable for the lenses are those that are non-absorbing at the wavelength of the incident energy. The individual lenses in the array preferably have numerical apertures greater than 0.3 and diameters greater than 30 micrometers but less than 10 mm. These arrays may have antireflection coatings to reduce the effects of back reflections that may cause internal damage to the lens material. In addition, single lenses with an effective negative focal length and dimensions equivalent to the lens array may also be used to increase the divergence of the light leaving the array. Shapes of the individual lenslets in a monolithic array are chosen to have a high numerical aperture and provide a large fill factor of approximately greater than 60%.

Figures 10, 16:
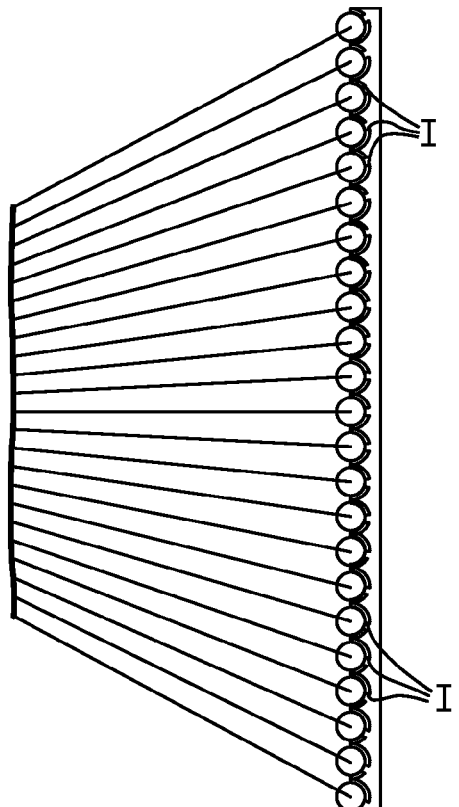
FIG. 10 is a graphical representation of divergent energy impinging on a microlens sheeting constructed of microspheres.
FIG. 16 is a top view of another embodiment of a user interface of the present invention including composite images that appear to float above, appear to float in, and appear to float below the sheeting.

FIG. 10 is a graphical schematic representation of divergent energy impinging on a microlens sheeting. The portion of the material layer on or in which an image I is formed is different for each microlens, because each microlense "sees" the incoming energy from a different perspective. Thus, a unique image is formed in the material layer associated with each microlens.

After imaging, depending upon the size of the extended object, a full or partial image of the object will be present in the radiation sensitive material behind each microsphere. The extent to which the actual object is reproduced as an image behind a microsphere depends on the energy density incident upon the microsphere. Portions of an extended object may be distant enough from a region of microlenses that the energy incident upon those microspheres has an energy density lower than the level of radiation required to modify that material. Moreover, for a spatially extended image, when imaging with a fixed NA lens, not all portions of the sheeting will be exposed to the incident radiation for all parts of the extended object. As a result, those portions of the object will not be modified in the radiation sensitive medium and only a partial image of the object will appear behind the microspheres.

In addition to providing a perspective view of a section of a microlens sheeting depicting sample individual, partially complete images 46 formed by the radiation sensitive donor material method described at the beginning of this section, FIG. 5 is also perspective view of a section of a microlens sheeting depicting sample images 46 formed in the radiation sensitive layer adjacent to individual microspheres, and further showing that the recorded images range from complete replication to partial replication of the composite image.

These composite images can also be thought of as the result of the summing together of many images, both partial and complete, all with different perspectives of a real object. The many unique images are formed through an array of miniature lenses, all of which "see" the object or image from a different vantage point. Behind the individual miniature lenses, a perspective of the image is created in the material layer that depends on the shape of the image and the direction from which the imaging energy source was received. However, not everything that the lens sees is recorded in the radiation sensitive material. Only that portion of the image or object seen by the lens that has sufficient energy to modify the radiation sensitive material will be recorded.

The "object" to be imaged is formed through the use of an intense light source by either tracing the outline of the "object" or by the use of a mask. For the image thus recorded to have a composite aspect, the light from the object must radiate over a broad range of angles. When the light radiating from an object is coming from a single point of the object and is radiating over a broad range of angles, all the light rays are carrying information about the object, but only from that single point, though the information is from the perspective of the angle of the light ray. Now consider that in order to have relatively complete information about the object, as carried by the light rays, light must radiate over a broad range of angles from the collection of points that constitute the object. The range of angles of the light rays emanating from an object is controlled by optical elements interposed between the object and the microlens material. These optical elements are chosen to give the optimum range of angles necessary to produce a composite image. The best selection of optical elements results in a cone of light whereby the vertex of the cone terminates at the position of the object. Optimum cone angles are greater than about 40 degrees.

The object is demagnified by the miniature lenses and the light from the object is focused onto the energy sensitive coating against the backside of the miniature lens. The actual position of the focused spot or image at the backside of the lens depends upon the direction of the incident light rays originating from the object. Each cone of light emanating from a point on the object illuminates a fraction of the miniature lenses and only those miniature lenses illuminated with sufficient energy will record a permanent image of that point of the object.

Various geometric optics used to describe the formation of various composite images are disclosed in the U.S. Pat. No. 7,068,434 (Florczak et al.), which is hereby incorporated by reference, for example the disclosure related to FIGS. 8-16. As noted previously, the imaging processes described herein are preferred, but not exclusive, embodiments.

Although only two methods of creating floating composite images are described herein, the present invention is not limited thereby. Instead, the present invention includes composite image or other similar images made by other methods known by those skilled in the art.

II. Composite Floating Images in User Interfaces

As mentioned in the beginning of this Description of the Invention, the present invention describes user interfaces including composite floating images. As mentioned previously, when using the term "user interface" herein, including the claims, this means any interface designed to allow a person to receive information from or to interact with. The information could be received visually, but it could also be received through auditory or sensory means. For example, a user interface could include automotive dashboards, aircraft cockpit surfaces, nuclear control rooms, control towers, informational kiosks for advertising, ordering, processing, etc., phones, PDAs, GPS units, screens of computers, voice-activated screens, or any other type of interface where a person is receiving information or interacting with the user interface. User interfaces including composite floating images assist a user in searching the user interface for certain information quicker and potentially processing information with less mistakes, thus improving the viewer's overall performance when interacting with the user interfaces of the present invention. In one embodiment of the present invention, such user interfaces include floating images which may display different types of information having different levels of importance to the user. Such floating images are viewed at different distances floating above or floating below a sheeting in the user interface, the float distance preferentially may depend on the level of importance of the information to which it pertains, as explained below in more detail.

It is not "common knowledge" among human interface designers that depth can be useful for improving viewer performance with human user interfaces. Most human interface designers do not have extensive expertise in human vision, and it is not even common knowledge among vision scientists that stereoscopic depth information can be used to improve viewer performance. For example, it was not until 2003 that Puhakka, Hakkinen, and Laarni in their publication demonstrated that preknowledge of target depth affected visual processing. (See, e.g. Puhakka, M., Hakkinen, J. and Laarni, J. (2003) "Does preknowledge of target depth affect visual processing." Journal of Vision 3 (9), 559. In fact, according to one publication, it is unknown to those skilled in the art whether or not that depth is a factor that impacts human visual search performance and visual attention. (See, e.g. Wolfe, J. M., & Horowitz, T. S. (2004), "What attributes guide the deployment of visual attention and how do they do it?", Nature Reviews Neuroscience, 5 (6), 495-501.)

It is believed by the inventors that depth can be used to improve visual attention and search performance in user interfaces, as evidenced by the Examples below, particularly using floating composite images to create the appearance of depth. As a result of the present invention, depth of visual elements in a user interface could be manipulated to help users attend to critical information. For instance, the information appearing to be presented in the foreground as floating images would be preferentially attended to, in comparison to information appearing to be presented in the background. For example, depth of certain displayed information in instrument panels could help drivers of automobiles or pilots of airplanes attend to safety critical information, such as fuel, air speed or altitude. However, depth is often not used in the instrument panels of automobiles or airplane cockpits because space is generally limited for displaying information at various actual depth locations relative to the display. The user interfaces of the present invention include composite floating images which either appear to float above, float below or in the plane of the instrument plane without requiring thick user interfaces, expensive display technology, or invasive tools, such as goggles. In essence, the user interface presents information that appears to be displayed at various depths or heights, while in reality, the user interface includes a sheeting which is generally along one plane, which makes them especially useful where different depth locations are limited.

Regarding specifically user interfaces in automobile instrument panels, research has indicated that lack of attention to relevant driving events is one of the main factors in traffic accidents. (See, e.g., Rumar, K. (1990), "The basic driver: Late detection." *Ergonomics,* 33(10-11), 1281-1290.) As such, it has been a major goal of automotive design engineers to reduce the attentional load on drivers. Reducing the attentional load allows drivers to allocate their attention to safety critical tasks of driving. To the extent that the composite floating images are incorporated into user interfaces of the present invention, such as instrument panels of automobiles, such user interfaces may assist in improving driver safety and situational awareness in at least the four following aspects.

First, floating composite images may be used to exploit the depth perception of a user to allow the use of depth as a visual grouping cue in the user interfaces of the present invention. Such grouping helps improve visual search performance and reduces viewer attention load to search within the group and therefore not allocate attention to items outside of the group.

Second, floating composite images may be used to exploit the depth perception of a user to allow the use of presentation of information at various depths to improve visual searches. Creating different planes of depth with floating images can facilitate the ability of drivers to visually scan user interfaces of the present invention, and thus, improve visual search performance, and selectively attend to information presented by such user interfaces. The human visual system is more adept at searching for information within a depth plane than between depth planes. So, once the viewer learns that certain types of visual information are to be found within a specific depth plane of the user interfaces of the present invention, the user will be more efficient at looking for this information in the future.

Third, floating composite images may be used to exploit the depth perception of a user to allow the use of depth to direct visual attention in the user interfaces of the present invention. Depth information can be used to guide visual attention to the most safety critical information in the instrument panel. That is, depth information in the foreground is preferentially attended to relative to depth information in the background, so engineers probably will want to place the safety critical information in the foreground of the user interfaces of the present invention, with less safety critical information presented in other than the foreground and thus improve attention allocation to the safety critical information.

Fourth, as another example, related or similar visual elements may be presented in the form of floating images that are grouped on the same depth planes of the user interfaces of the present invention. When related or similar visual elements are grouped together in the same depth plane, it takes less time and requires less concentration by the person to search out the information in the user interface and to process such information, thus making it is easier for the user to use the interface and to react more quickly to the information, if necessary, particularly when the visual elements are related to the same task or metal operation. For instance, if a first composite image and a second composite image are related to the same or similar task or mental operation, it is preferred that both images appear to float approximately the same distance either above or below the sheeting of the user interface within approximately the same "plane". By referring to approximately being in the same plane, this is meant to include the situation where even though the first and second composite images are not exactly in the same plane, they are close enough to each other in depth that the human visual system would not be able to process the fact that they are in slightly different planes. It is also preferred that both the first and second composite images are in close proximity to one another. When determining close proximity, various factors should be taken into account, such as the relative size of the user interface and the number and size of the floating images and number of other distractors. In one preferred embodiment, it is preferred that the maximum distance between two floating images that are related to the same or similar task or mental operation be within one-quarter of the length or width of the given user interface. However, some skilled in the art would consider close proximity to be determined by whatever visual elements are closest together, depending on a given interface. Regardless, in at least one embodiment of the present invention, it is preferred that floating images that are related to the same or similar task or mental operations appear to float within the same plane or have a similar float distance from the user interface and are located within close proximity of each other to allow the user to associate them together. For floating images that are presented in different planes, it is preferred that the distance between these different planes is at least 1 mm, but it depends on what conditions exist for the given user interface, such as the distance between the user and the interface and how many distractors exist. In one embodiment, the user interface could include a first composite image which is a three-dimensional image, and a second composite image that is a two-dimensional image. In this embodiment, it is preferred that the perceived height of the second composite image be comparable to the height of the three-dimensional first composite image.

To help illustrate, in one embodiment of the present invention, in an airplane cockpit, indicators of engine speed and electrical output could be displayed in the form of floating images floating below the plane of the airplane instrument panel, and altitude, airspeed, and fuel could be displayed in the form of floating images floating above the plane of the airplane instrument panel. The engine speed and electrical output are not as critical from a safety standpoint, in comparison to the altitude, airspeed, and fuel. Thus, one wants information that has a higher safety critical component to be more easily ascertainable to the user, accomplished by placing said information in the near field of the operator. As a result, the altitude, airspeed and fuel are more easily ascertainable to the user in their relative locations to the plane of the instrument panel. By placing such information in the near field to the operator. The altitude, airspeed and fuel are all safety critical information and thus are related to the same task or mental operation, i.e., flying the plane safety. Therefore, it is preferred that all three floating images appear to be floating the same distance above the airplane instrument panel.

In another embodiment of the present invention, in an automobile, the engine tachometer could be displayed in the form a floating image floating below the plane of the instrument panel, and the speedometer and "check engine" light or other warning lights could be displayed in the form of a floating image floating above the plane of the instrument panel. The speedometer and "check engine" light or other warning lights are more critical information to the driver and thus, in its relative position to the plane of the instrument panel could be more easily ascertainable to the user. In another embodiment, the tachometer or other such information could be displayed during most of the time that the car is running in a floating image below the plane of the instrument panel. When conditions exist such that a warning should be indicated, a warning light in the form of a floating image above the tachometer or other such information in the instrument panel could "pop on" to attract the attention of the driver, when that selected condition occurs.

Figure 11:
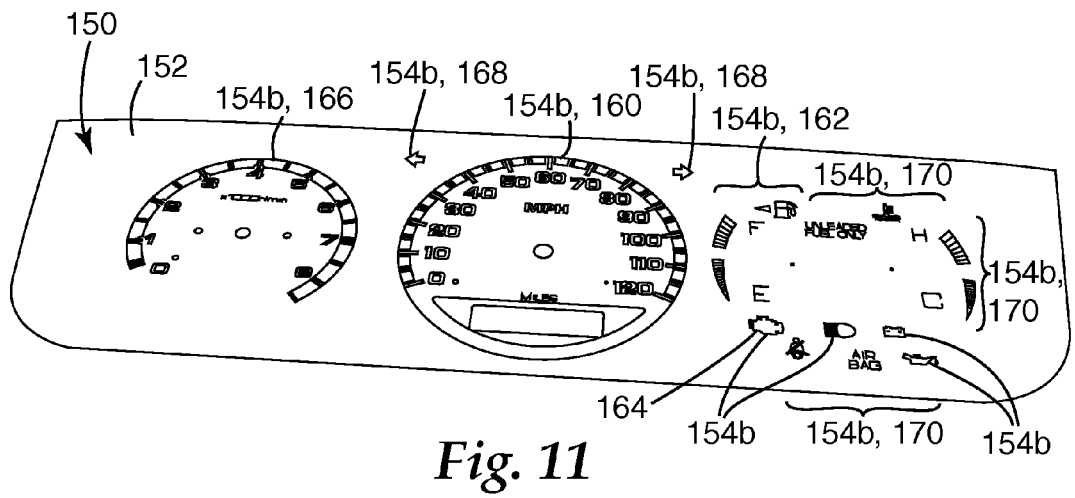
FIG. 11 is a perspective view of one embodiment of a user interface where all the visual elements are in the same plane.
Figure 12:
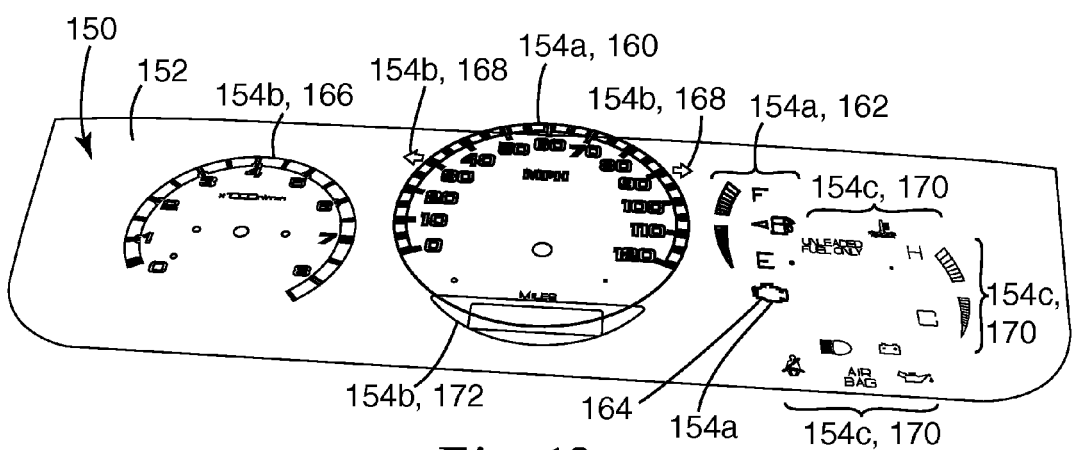
FIG. 12 is a perspective view of another embodiment of a user interface of the present invention where all the visual elements are organized into three distinct depth planes and where the categories of visual elements are segregated by depth plane.
Figure 13:
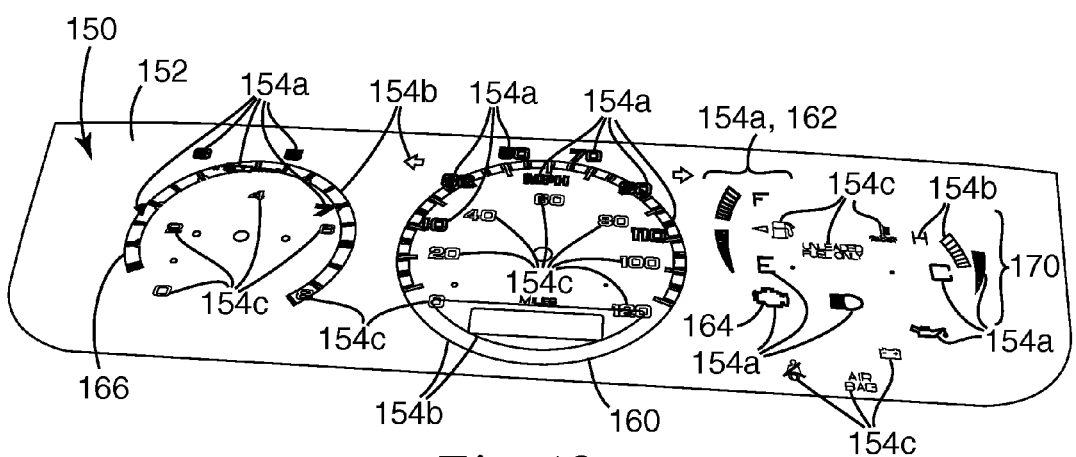
FIG. 13 is perspective view of user interface of another embodiment of a user interface of the present invention where all the visual elements are organized into three distinct depth planes, but the categories of visual elements is not segregated by depth plane.

FIGS. 11-13 illustrate how the use of the depth or height at which the floating composite images appear to float above, below or in the plane of the user interface can improve the ease with which the viewers can visually process an user interface, in this case an instrument panel of a dashboard of an automobile, and help to direct the viewer's attention to two elements of the instrument panel, such as speed and fuel.

FIG. 11 illustrates one embodiment of a user interface 150 that includes a sheeting 152. The sheeting includes a plurality of various floating composite images 154. In this illustration, all the visual elements in the user interface 150 are the form of floating composite images 154b, which are all floating in the same plane, specifically the plane of the sheeting 152. The visual elements include indicators of speed 160, fuel 162, the "check engine" light 164, the tachometer 166, turn signals 168, and various vehicle diagnostics 170, such as high beams, air bag, oil, battery, coolant temperature, and engine temperature.

FIG. 12 illustrates another embodiment of a user interface of the present invention where all the visual elements presented in the form of floating composite images are organized into three distinct depth planes and where categories of visual elements are segregated by depth plane. Visual elements of speed 160, fuel 162, and "check engine" light 164 are in the foreground depth plane in the form of composite images 154a that appear to float above the sheeting 152. Visual elements relevant to the immediate driving task, such as the tachometer 166, turn signal 168 and odometer 172, are in the middle depth plane, which is in the plane of the sheeting 152 of the user interface 150, in the form of floating composite images 154b that appear to float in the plane of the sheeting 152. The visual elements relevant to less important tasks, such as vehicle diagnostics 170, are in the background depth plane, in the form of composite images 154c, which appear to float below the sheeting 152. Such arrangement of visual elements in the form of such composite images 154a, 154b, and 154c directs more visual attention from the driver towards the speed, fuel and engine status elements. Furthermore, as viewers learn the type of information within each depth plane, the viewers should perform better on visual search tasks because they would preferentially attend to the depth plane that contains the information they are seeking. In this particular embodiment, the composite images are arranged according to how they relate to the same or similar task or mental operation, specifically in relation to how critical the information is to the driver. Notice also how in addition to floating in the same plane, the floating images of speed 160, fuel 162, and "check engine" light 164 are located within close proximity to one another, towards the center of the user interface 150. Lastly, in this particular embodiment, note how the fuel floating image 162 is made of four floating image components, the "F", the "E", the curved portion, and indicator with the gas pump sign. All four portions are considered all related to the same task or mental operation, indicating the fuel level, and thus, all portions preferably appear to float above the user interface 150 approximately the same distance.

FIG. 13 illustrates another embodiment of a user interface of the present invention where all the visual elements in the form of floating composite images are organized into three distinct depth planes, but the categories of visual elements are not segregated by depth planes. In this case, the labels of some speedometer elements (10, 30, 50, 70, 90, 110) and some tachometer elements (1, 3, 5, 7) are in the form of floating images 154a that appear to float above the sheeting 152. The labels of other speedometer elements (0, 20, 40, 60, 80, 100, 120) and other tachometer elements (0, 2, 4, 6, 8) are in the form of floating images 154c that appear to float below the plane of the sheeting 152. The gauge positions and labels of other speedometer elements and other tachometer elements are in the form of floating images 154b that appear to float in the plane of the sheeting 152. The warning lights and other vehicle diagnostics 170 are distributed among the three planes. For example, "check engine" light 164, the "F" and "E" of the fuel indicator 162, the "C" portion of the coolant temperature indicator, the oil light are in the form of floating images 154a that appear to float above the plane of the sheeting 152. As another example, the "H" portion of the coolant indicator is in the form of a floating image 154b that appear to float in the plane of the sheeting 152. As another example, the indicator portion of the fuel indicator 162, the seatbelt indicator, airbag indicator, and battery indicator, coolant level, unleaded fuel are in the form of floating images 154c, which appear to float below the sheeting 152. As a result, it is expected that the viewers should have significantly more difficulty visually processing this user interface. Visual attention would be consumed by having to combine information selected from one depth plane with information from another depth plane, for examples such as combining the speed numbers with the indicator marks or hatch marks on the dials, in the tachometer 166, speedometer 160, and fuel 162. However, note that at least portions of some of the visual elements are located along the same plane appearing as floating images, for example the labels of some speedometer elements (10, 30, 50, 70, 90, 110), which are all related to the same task, the speed of the automobile.

Figure 14:
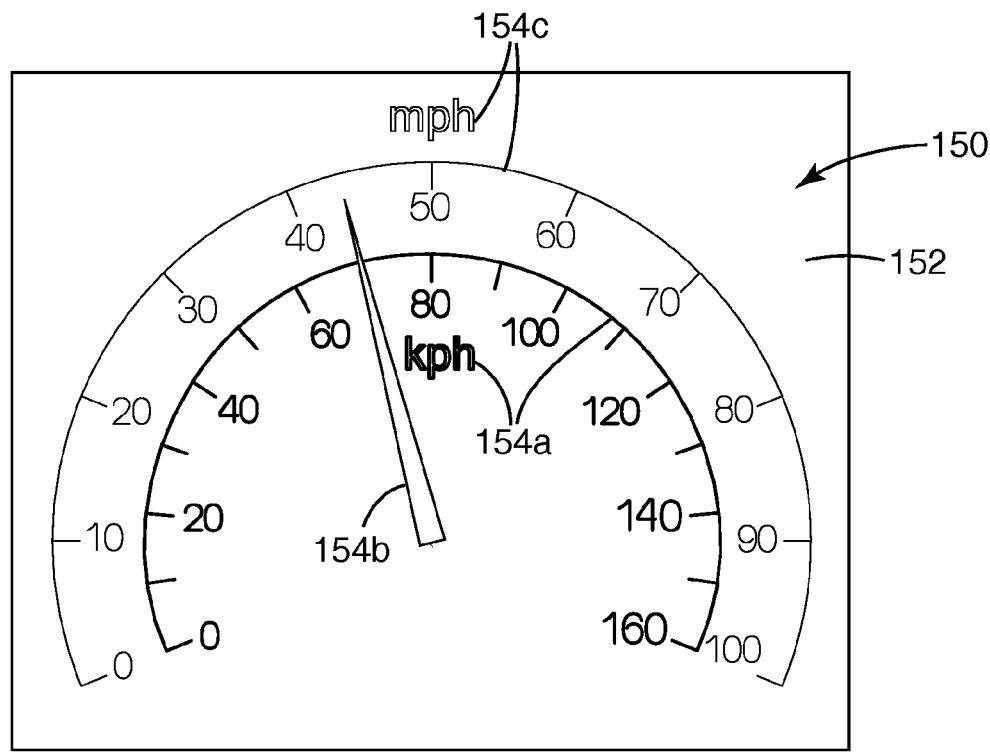
FIG. 14 is a top view of a one embodiment of a user interface of the present invention including composite images that appear to float above, appear to float in, and appear to float below the sheeting.
Figure 15:
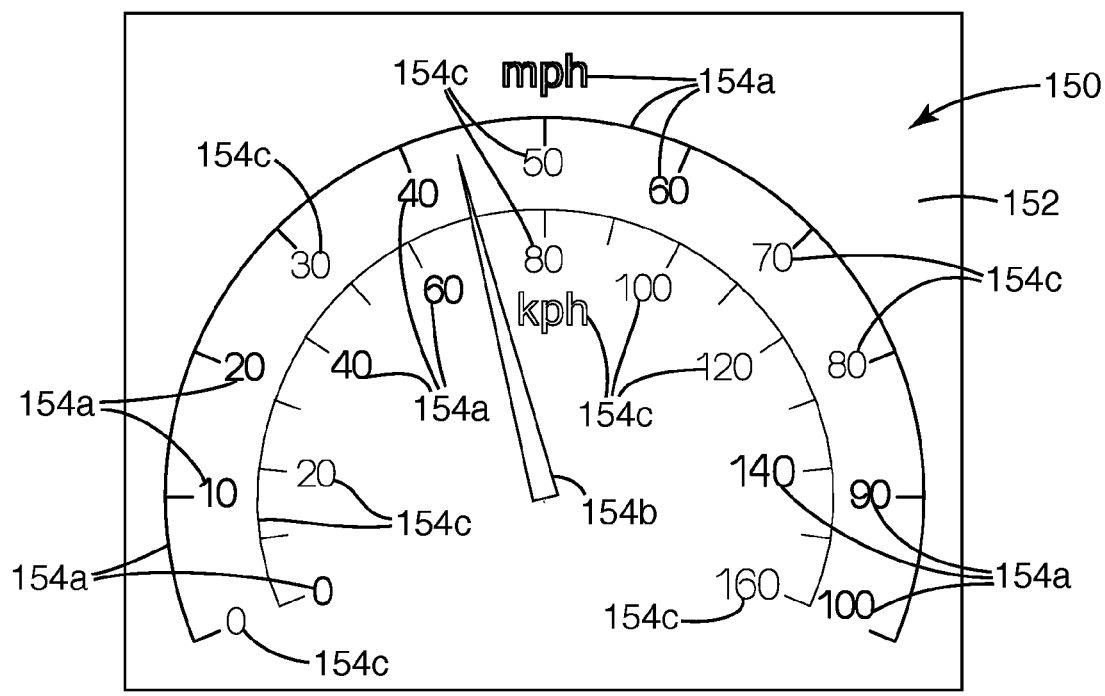
FIG. 15 is a top view of another embodiment of a user interface of the present invention including composite images that appear to float above, appear to float in, and appear to float below the sheeting.

What the inventors have discovered is that by simply adding information at different visual depths in the form of composite floating images does not automatically improve visual performance. Instead, it is preferred that floating images that relate to the same task or mental operation should appear to float in the same plane, either above or below the sheeting. In contrast, when images that relate to the same task or mental operation appear in different planes, either above or below the plane of the user interface display, it is harder for the user to process the information. FIGS. 14 and 15 help illustrate this concept. In FIG. 14, the user interface 150 includes sheeting 152. The sheeting 152 includes a plurality of floating images 154, which make up a speedometer, presenting information both in the form of miles per hour ("mph") and kilometers per hour ("kph"). The floating images 154a related to kph features appear to float above the sheeting 152. The floating images 154c related to mph features appear to float below the sheeting 152. The speed indicator is in the form of floating image 154b and appears to be floating in the plane of the sheeting 152. All the numbers and curved lines and hatch marks related to mph features are appearing to float in the same plane below the sheeting 152. All the numbers and curved lines and hatch marks related to kph features are appearing to float in the same plane above the sheeting 152. This is an example, where the floating images 154a, 154b, 154c, respectively, are related to the same task or mental operation, specifically in this case, related to kph features. The floating images 154c are related to the same task or mental operation, specifically in this case, related to mph features.

In contrast, FIG. 15 illustrates where floating images related to the same task or mental operation are not appearing to float in the same plane. FIG. 15 illustrates the floating images 154a related to the numbers 10, 20, 40, 60, 90, and 100 affiliated with mph, the floating images related to the curved lines and hatch marks affiliated with mph, and the numbers 0, 40, 60, 140 affiliated with kph are all appearing to float in the same plane above the sheeting 152. The floating images 154c related to the numbers 0, 30, 50, 70, and 80 affiliated with mph, the floating images related to the curved lines and hatch marks affiliated with kph, and the numbers 20, 80, 100, 120, and 160 affiliated with kph are all appearing to float in the same plane below the sheeting 152. A user of the user interface illustrated in FIG. 15 would have more difficulty processing the information as to what speed his automobile is traveling, in contrast to the user interface illustrated in FIG. 14.

Various modifications and combinations of the embodiments disclosed will be apparent to those skilled in the art, and those modifications are intended to be within the scope of the invention as defined in the appended claims.

EXAMPLES

Example 1

Sixteen example sheets (or stimuli) of various combinations of composite floating images at various depths or heights relative to the plane of the sheeting were created. The example sheets were prepared according to the process described in U.S. Pat. No. 6,288,842 (Florczak et al.), which is hereby incorporated by reference. The sheet material used to create the sixteen example sheets was black Scotchlite™ Reflective Graphic film Series 680 (available from 3M Company, St. Paul, Minn.). This film contains a layer of small glass beads, or microlenses, and an opaque layer behind the microlenses. The floating images written to the example sheets were written to appear in one of two planes:—floating 6 mm above the plane of the sheeting and sinking 6 mm below the plane of the sheeting. When the imaged sheetings were illuminated from the back side with a white light source, i.e. from the direction of the opaque layer, the floating images appeared as substantially white images on a black background. To obtain colored stimuli, a colored transparency film was placed between the white light source and the sheeting containing the floating and sinking composite images.

Each stimulus consisted of Xs and Os arranged in 19 columns by 9 rows, as illustrated in FIG. 16. The Xs in each of the stimuli were either blue or red. For each stimuli there was only one blue O (hereinafter referred to as SBO). Eight of the stimuli, hereinafter referred to as non-unique target stimuli, were created such that the SBO was written to appear to be in the same plane as the other letters in the stimulus. Four of the non-unique target stimuli were created such that all of the letters appeared to sink below the sheet and the other four of the non-unique stimuli were created such that the letters appeared to float above the sheet. Eight of the stimuli, hereinafter referred to as the unique target stimuli, were created such that the SBO was written to appear to float in the opposite plane from the other letters. Four of the unique target stimulus were created such that the SBO appeared to sink below the sheet and the other letters appeared to float above the sheet, and the other four unique target stimuli were created such that the SBO appeared to float above the sheet and the other letters appeared to sink below the sheet.

Evaluation of the impact of the invention upon human visual search performance was assessed as follows. Eight persons (Subjects) with normal or corrected to normal vision who did not know the purpose of this experiment, were seated individually in front of a backlight display upon which a stimuli was placed, with each individual positioned such that their head was positioned via a chinrest so that their eyes were positioned precisely 16 inches from and perpendicular to the stimuli on the backlight display. Presentation of the stimuli was self-paced. Subjects were instructed to open their eyes and press a key on a button box to begin each trial. Each Subject was tasked to press a second button on the button box as soon as they found the SBO in the stimuli.

Subjects completed two practice trials prior to the experiment proper. A practice trial consisted of presenting a randomly selected stimuli to each subject once. For one practice trial, the stimuli was selected from the unique target stimulus. For the other practice trial, the stimuli was selected from the non-unique target stimulus. Half of the Subjects completed the unique target stimulus practice trial first and the other half of the Subjects completed the non-unique target stimulus practice trial first. Experiment 1 consisted of 16 trials with each of the 16 stimuli being presented once.

Presentation order for the experimental trials was chosen at random with each subject viewing a different presentation order. The presentation order of the stimuli to Subjects 1-4 was reversed for Subjects 5-8 to reduce the possibility of any order effect.

The mean visual search times for finding the SBO by the Subjects in the non-unique target stimuli and in the unique target stimuli are shown in FIG. 16.

The mean visual search time for unique target stimuli (1782 msec) was shorter than the mean visual search time for non-unique target stimuli (4385 msec), $p<0.01$. [The p-value is a measure of probability that the difference between means in the conditions happened by chance. A result is considered by the scientific community to be trustworthy if there is less than a 5% chance that the result happened by chance (i.e., if the p-value is $<0.05$).]

Example 2

Eight example sheets (stimuli) were prepared as in Example 1, except each stimulus consisted of a monotone (white) speedometer-type dial modeled after a typical automobile dashboard element, such as a speedometer, and a white indicator (needle), as shown in FIG. 14. These eight stimuli were divided into three image presentation formats: single plane, layered planes and mixed planes. For the pair of stimuli identified as single plane condition, the entire artwork was written in a single plane. One single plane stimulus was written such that all of the images (artwork) appeared to sink below the plane of the sheet, and the other single plane stimulus was written such that all of the artwork appeared to float above the plane of the sheet. Further, the number labels and dial marks in the artwork were divided into two groups of features according to the units of measure; labels for miles per hour and its associated dial marks hereinafter referred to as "mph features", and labels for kilometers per hour and its associated dial marks hereinafter referred to as "kph features". For the stimuli identified as the layered planes condition, one stimulus was created where the mph features were written to appear floating above the plane of the sheet and where the kph features were written to appear sinking below the plane of the sheet, similar to the user interface illustrated in FIG. 14. For the other stimulus of the layered planes condition, the mph features were written to appear sinking below the plane of the sheet, and the kph features were written to appear floating above the plane of the sheet. For the group of stimuli identified as the mixed planes condition, the number labels and dial marks for mph features and kph features were written to appear in a random mixture of locations floating above the plane of the sheet and sinking below the plane of the sheet, similar to the user interface illustrated in FIG. 15.

Similar to Example 1, evaluation of the impact of the invention upon human visual search performance was assessed as follows. The same eight persons (Subjects) as in Example 1, with normal or corrected to normal vision who did not know the purpose of this experiment, were seated individually in front of a backlight display upon which a stimuli was placed, with each individual positioned such that their head was positioned via a chinrest, so that their eyes were positioned precisely 16 inches from and perpendicular to the stimuli on the backlight display. Presentation of the stimuli was self-paced. Subjects were instructed to open their eyes and press a key on a button box to begin each trial.

Just prior to the start of each trial, each subject was instructed to report the indicated speed in either kph or mph and was informed as to the location of that scale (e.g., for a mph reporting trial, subjects were told whether the mph scale floated above the kph scale, sank below the kph scale, was on the same plane as the kph scale, or, was mixed between two planes, in which case, the kph scale was also mixed between the planes. The speed indicated on a given trial was chosen at random. Subjects were instructed to open their eyes and press a key on a button box to begin each trial. Each subject was tasked to verbally report the speed indicated in the scale requested as quickly and accurately as possible.

The experiment was separated into three blocks: a single plane stimulus block, a layered planes stimulus block, and a mixed planes stimulus block. The order of presentation of each block was chosen at random. Subjects completed two practice trials prior to each block. The stimuli for the practice trials were chosen at random from the experimental stimuli of that type. Presentation order for the experimental trials was chosen at random with each participant viewing a different presentation order. The presentation order of the stimuli to Subjects 1-4 was reversed for Subjects 5-8 to reduce the possibility of any order effect.

Figure 17:
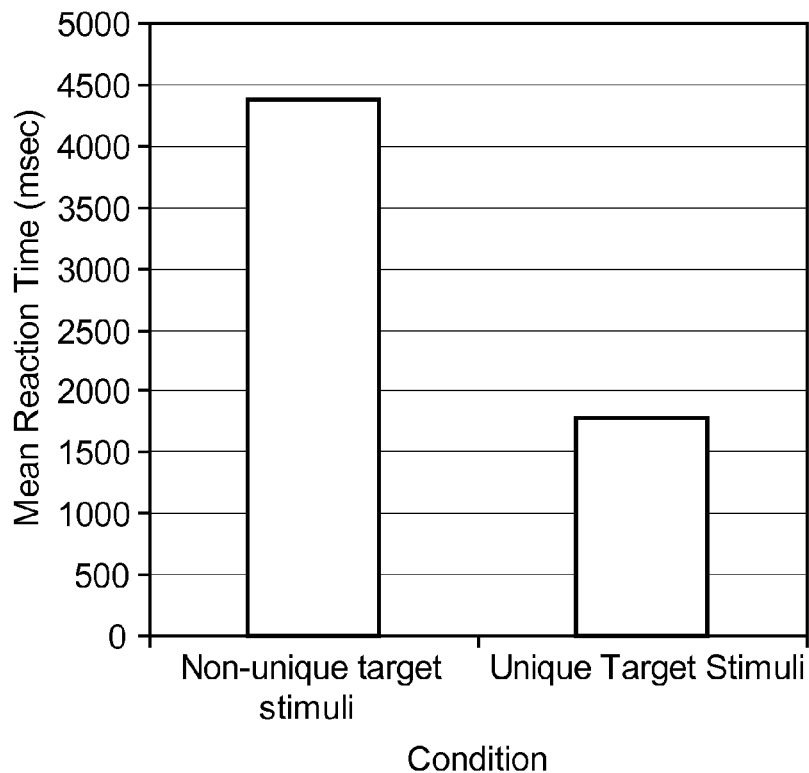
FIG. 17, is a table showing results from Experiment 1.
Figure 18:
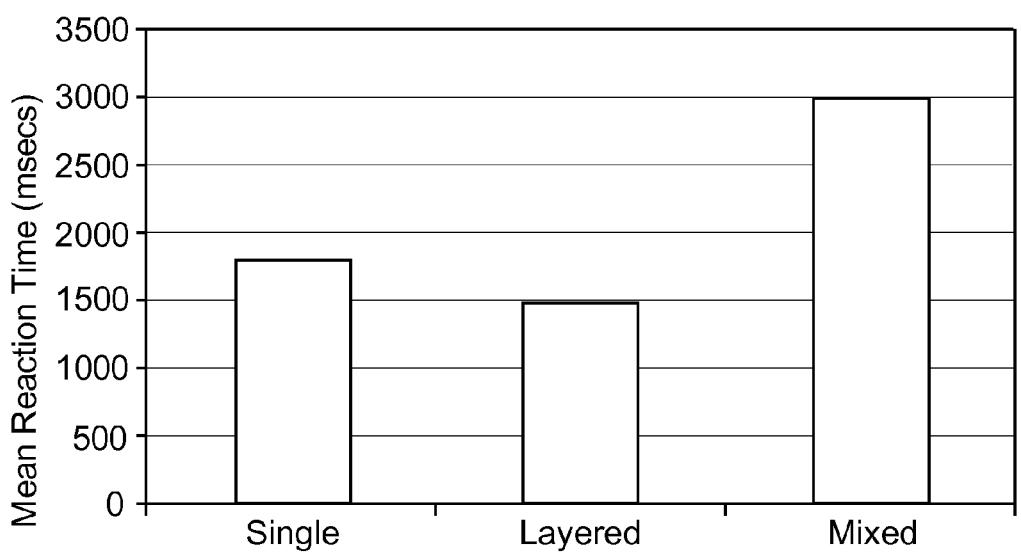
FIG. 18 is a table showing the mean reaction time (in milliseconds) to verbally report the speed indicated for each of the three conditions, as referenced to in the Examples.

The mean visual search times for reporting the speed indicated in the single plane stimuli, layered planes stimuli, and the mixed planes stimuli are shown in FIG. 17.

The mean response time for layered planes stimuli (1486 msec) was shorter than the mean response time for the single plane stimuli (1812 msec) and the mixed planes stimuli had the highest mean response time of (3004 msec); $p<0.0001$.

We claim:

1. A user interface, comprising:
   a sheeting, comprising:
   at least one layer of microlenses, the layer having first and second sides;
   a layer of material disposed adjacent the first side of the layer of microlenses; and
   an at least partially complete image formed in the material associated with each of a plurality of the microlenses, wherein the image contrasts with the material;
   a first composite image, provided by the individual images, that appears to the unaided eye to float at a first distance above the sheeting;
   a second composite image, provided by the individual images, that appears to the unaided eye to float at a second distance above the sheeting,
   wherein the first and second distances are approximately the same distance, wherein the first and second composite images are related to the same task or mental operation.

2. The user interface of claim 1, wherein the first and second composite images are in close proximity to one another.

3. The user interface of claim 1, wherein the user interface further comprises a plurality of composite images, provided by the individual images in the sheeting, that appears to the unaided eye to float above the sheeting, float below the sheeting or float at least in part of the plane of the sheeting.

4. The user interface of claim 2, wherein the composite images that relate to the same task or mental operation are approximately at the same distance above or below the sheeting or at least in part of the plane of the sheeting.

5. The user interface of claim 1, wherein the composite images appear under reflected light to float above the sheeting.

6. The user interface of claim 1, wherein the composite images appear in transmitted light to float above the sheeting.

7. The user interface of claim 1, wherein at least one of the composite images also appears to the unaided eye to be at least in part in the plane of the sheeting.

8. The user interface of claim 1, wherein at least one of the composite images appears to move relative to the sheeting as the viewing position changes relative to the sheeting.

9. The user interface of claim 1, wherein at least one of the composite images disappears and reappears when the angle at which the sheeting is viewed changes.

10. The user interface of claim 1, wherein at least one of the composite images is a two-dimensional image.

11. The user interface of claim 1, wherein the first composite image appears to the user when a selected condition occurs.

12. A user interface, comprising:
    a sheeting, comprising:
    at least one layer of microlenses, the layer having first and second sides;
    a layer of material disposed adjacent the first side of the layer of microlenses; and
    an at least partially complete image formed in the material associated with each of a plurality of the microlenses, wherein the image contrasts with the material;
    a first composite image, provided by the individual images, that appears to the unaided eye to float at a first distance below the sheeting;
    a second composite image, provided by the individual images, that appears to the unaided eye to float at a second distance below the sheeting,
    wherein the first and second distances are approximately the same distance, wherein the first and second composite images are related to the same task or mental operation.

13. The user interface of claim 12, wherein the first and second composite images are in close proximity to one another.

14. The user interface of claim 12, wherein the sheeting further comprises a plurality of composite images, provided by the individual images in the sheeting, that appears to the unaided eye to float above the sheeting, float below the sheeting or floating in the plane of the sheeting.

15. The user interface of claim 14, wherein the composite images that relate to the same task or mental operation are approximately at the same distance above or below the sheeting or in the plane of the sheeting.

16. The user interface of claim 12, wherein the composite images appear under reflected light to float below the sheeting.

17. The user interface of claim 12, wherein the composite images appear in transmitted light to float below the sheeting.

18. The user interface of claim 12, wherein at least one of the composite images also appears to the unaided eye to be at least in part in the plane of the sheeting.

19. The user interface of claim 12, wherein at least one of the composite images appears to move relative to the sheeting as the viewing position changes relative to the sheeting.

20. The user interface of claim 12, wherein at least one of the composite images disappears and reappears when the angle at which the sheeting is viewed changes.

21. The user interface of claim 12, wherein at least one of the composite images is a two-dimensional image.

22. The user interface of claim 12, wherein the first composite image appears to the user when a selected condition occurs.

23. A user interface, comprising:
a sheeting, comprising:
an array of micro lenses;
a material layer adjacent the array of microlenses; and
a first donor material in contact with the material layer, wherein the donor material forms individual, partially complete images on the material layer associated with each of a plurality of the microlenses;
a first composite image, provided by the individual images, that appears to the unaided eye to float at a first distance above the sheeting;
a second composite image, provided by the individual images, that appears to the unaided eye to float at a second distance above the sheeting,
wherein the first and second distances are approximately the same distance, wherein the first and second composite images are related to the same task or mental operation.

24. The user interface of claim 23, wherein the first and second composite images are in close proximity to one another.

25. The user interface of claim 23, wherein the user interface further includes a plurality of composite images, provided by the individual images in the sheeting, that appears to the unaided eye to float above the sheeting, floating below the sheeting or floating in the plane of the sheeting.

26. The user interface of claim 25, wherein the composite images that relate to the same task or mental operation are approximately at the same distance above or below the sheeting or in the plane of the sheeting.

27. The user interface of claim 23, wherein the composite images appear under reflected light to float above the sheeting.

28. The user interface of claim 23, wherein the composite images appear in transmitted light to float above the sheeting.

29. The user interface of claim 23, wherein at least one of the composite images also appear to the unaided eye to be at least in part in the plane of the sheeting.

30. The user interface of claim 23, wherein the first donor material comprises a colorant, and wherein at least a portion of the composite image exhibits a color similar to the colorant in the donor material.

31. The user interface of claim 23, wherein at least one of the composite images appear to move relative to the sheeting as the viewing position changes relative to the sheeting.

32. The user interface of claim 23, wherein at least one of the composite images disappears and reappears when the angle at which the sheeting is viewed changes.

33. The user interface of claim 23, wherein at least one of the composite images is a two-dimensional image.

34. The user interface of claim 23, wherein the first composite image appears to the user when a selected condition occurs.

35. A user interface, comprising:
a sheeting, comprising:
an array of microlenses;
a material layer adjacent the array of microlenses; and
a first donor material in contact with the material layer, wherein the donor material forms individual, partially complete images on the material layer associated with each of a plurality of the microlenses;
a first composite image, provided by the individual images, that appears to the unaided eye to float at a first distance below the sheeting;
a second composite image, provided by the individual images, that appears to the unaided eye to float at a second distance below the sheeting,
wherein the first and second distances are approximately the same distance, wherein the first and second composite images are related to the same task or mental operation.

36. The user interface of claim 35, wherein the first and second composite images are in close proximity to one another.

37. The user interface of claim 35, wherein the sheeting further comprises a plurality of composite images, provided by the individual images in the sheeting, that appears to the unaided eye to float above the sheeting, floating below the sheeting or float in the plane of the sheeting.

38. The user interface of claim 37, wherein the composite images that relate to the same task or mental operation are approximately at the same distance above or below the sheeting or in the plane of the sheeting.

39. The user interface of claim 35, wherein the composite images appear under reflected light to float below the sheeting.

40. The user interface of claim 35, wherein the composite images appear in transmitted light to float below the sheeting.

41. The user interface of claim 35, wherein at least one of the composite images also appears to the unaided eye to be at least in part in the plane of the sheeting.

42. The user interface of claim 35, wherein the first donor material comprises a colorant, and wherein at least a portion of the composite image exhibits a color similar to the colorant in the donor material.

43. The user interface of claim 35, wherein at least one of the composite images appears to move relative to the sheeting as the viewing position changes relative to the sheeting.

44. The user interface of claim 35, wherein at least one of the composite images disappears and reappears when the angle at which the sheeting is viewed changes.

45. The user interface of claim 35, wherein at least one of the composite images is a two-dimensional image.

46. The user interface of claim 35, wherein the first composite image appears to the user when a selected condition occurs.

* * * * *

UNITED STATES PATENT AND TRADEMARK OFFICE
CERTIFICATE OF CORRECTION

| | | |
|---|---|---|
| PATENT NO. | : 7,800,825 B2 | Page 1 of 2 |
| APPLICATION NO. | : 11/566578 | |
| DATED | : September 21, 2010 | |
| INVENTOR(S) | : Brooks et al. | |

It is certified that error appears in the above-identified patent and that said Letters Patent is hereby corrected as shown below:

ON THE TITLE PAGE
Item (56) References Cited
On Page 2
Column 1 (U.S. Patent Documents); Line 28, Delete "4,783,124 A   11/1988 Baba et al." and insert -- 4,783,141 A   11/1988  Baba et al. --, therefor.

On Page 3
Column 1 (Other Publications); Line 10, Delete "Correlated" and insert -- Correlates --, therefor.

Column 2 (Other Publications); Line 2, Delete "Psychophsics," and insert -- Psychophysics, --, therefor.

Column 2 (Other Publications); Line 58, Delete "Agnew." and insert -- Angew. --, therefor.

Column 2 (Other Publications); Line 73, Delete "Image" and insert -- Images --, therefor.

On Page 4
Column 1 (Other Publications); Line 7, Delete "Photogrpahy" and insert -- Photography --, therefor.

IN THE SPECIFICATIONS
Column 1
Line 38; Delete "blindess" and insert -- blindness --, therefor.

Column 3
Line 29; Delete "sheeting." and insert -- sheeting; --, therefor.

Column 26
Line 15; Delete "16." and insert -- 17. --, therefor.

Signed and Sealed this
Fifteenth Day of May, 2012

David J. Kappos
*Director of the United States Patent and Trademark Office*

Column 27
Line 29; Delete "17." and insert -- 18. --, therefor.

IN THE CLAIMS
Column 29
Line 6; Claim 23, delete "micro lenses;" and insert -- microlenses; --, therefor.